United States Patent
Walker et al.

(10) Patent No.: US 9,331,800 B2
(45) Date of Patent: May 3, 2016

(54) VIRTUAL HOME CHANNEL FOR MOBILE BROADCAST NETWORKS

(75) Inventors: Gordon Kent Walker, Poway, CA (US); Binita Gupta, San Diego, CA (US); Ralph A. Gholmieh, San Diego, CA (US); Prasanna Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 459 days.

(21) Appl. No.: 12/901,047

(22) Filed: Oct. 8, 2010

(65) Prior Publication Data

US 2011/0122834 A1   May 26, 2011

Related U.S. Application Data

(60) Provisional application No. 61/264,147, filed on Nov. 24, 2009.

(51) Int. Cl.
*H04W 72/12* (2009.01)
*H04H 20/26* (2008.01)
*H04H 60/43* (2008.01)
*H04N 7/173* (2011.01)
*H04N 21/235* (2011.01)
(Continued)

(52) U.S. Cl.
CPC .............. *H04H 20/26* (2013.01); *H04H 60/43* (2013.01); *H04N 7/17318* (2013.01); *H04N 21/235* (2013.01); *H04N 21/41407* (2013.01); *H04N 21/435* (2013.01); *H04N 21/4345* (2013.01); *H04N 21/6131* (2013.01); *H04W 72/005* (2013.01); *H04H 20/93* (2013.01); *H04H 60/73* (2013.01)

(58) Field of Classification Search
USPC .............................................. 370/329; 725/48
See application file for complete search history.

(56) References Cited

U.S. PATENT DOCUMENTS 7,921,448 B2 *  4/2011  Fickle et al. .................... 725/95
7,948,907 B2    5/2011  Wang et al.
(Continued)

FOREIGN PATENT DOCUMENTS

CN        1860707 A      11/2006
JP     2002359825 A      12/2002
(Continued)

OTHER PUBLICATIONS

International Search Report and Written Opinion—PCT/US2010/057873—ISA/EPO—Mar. 16, 2011.
(Continued)

*Primary Examiner* — Sulaiman Nooristany
(74) *Attorney, Agent, or Firm* — The Marbury Law Group, PLLC

(57) ABSTRACT

Methods and systems simplify discovery and handoff for multi-frequency broadcast receiver devices, such as mobile TV devices, by providing a virtual home channel that is not dependent on a single frequency network upper layer. The methods and systems may be used in conjunction with a single frequency network upper layer to support areas without upper layer available, or to off load some portion of the common data bandwidth in the single frequency network. For example, the single frequency network may only carry frequency data for the multiple frequency network or only the frequency data for networks with comprehensive market metadata.

106 Claims, 12 Drawing Sheets

(51) Int. Cl.
*H04N 21/414* (2011.01)
*H04N 21/434* (2011.01)
*H04N 21/435* (2011.01)
*H04N 21/61* (2011.01)
*H04W 72/00* (2009.01)
*H04H 20/93* (2008.01)
*H04H 60/73* (2008.01)

(56) References Cited

U.S. PATENT DOCUMENTS

| | | | |
|---|---|---|---|
| 2005/0090278 A1* | 4/2005 | Jeong et al. | 455/525 |
| 2005/0232209 A1 | 10/2005 | Buckley et al. | |
| 2006/0037060 A1* | 2/2006 | Simms et al. | 725/119 |
| 2006/0053450 A1* | 3/2006 | Saarikivi et al. | 725/46 |
| 2006/0161635 A1* | 7/2006 | Lamkin et al. | 709/217 |
| 2006/0242091 A1* | 10/2006 | Jansky | 706/15 |
| 2006/0262793 A1 | 11/2006 | Vare et al. | |
| 2007/0298709 A1 | 12/2007 | Sinnarajah et al. | |
| 2008/0176559 A1 | 7/2008 | Vare et al. | |
| 2008/0253331 A1 | 10/2008 | Gupta et al. | |
| 2009/0010225 A1 | 1/2009 | Gupta | |
| 2009/0016380 A1 | 1/2009 | Gupta et al. | |
| 2009/0144771 A1* | 6/2009 | Bangma et al. | 725/39 |
| 2009/0197604 A1 | 8/2009 | Gupta et al. | |
| 2009/0274119 A1 | 11/2009 | Gupta et al. | |

FOREIGN PATENT DOCUMENTS

| | | |
|---|---|---|
| JP | 2007521777 A | 8/2007 |
| JP | 2009507444 A | 2/2009 |
| JP | 2009516943 A | 4/2009 |
| JP | 2009135926 A | 6/2009 |
| KR | 20060105781 A | 10/2006 |
| KR | 20080012328 A | 2/2008 |
| WO | 2005067492 A2 | 7/2005 |
| WO | 2006110456 A1 | 10/2006 |
| WO | 2007029090 A1 | 3/2007 |
| WO | 2007052128 A1 | 5/2007 |
| WO | 2008157816 A2 | 12/2008 |
| WO | 2009088261 A2 | 7/2009 |

OTHER PUBLICATIONS

ETSI TR 101 211 V1.9.1(Jun. 2009), [online], Jun. 2009, ETSI (European Telecommunications Standards Institute), pp. 1-58. <URL: http://www.etsi.org/deliver/etsi_tr/101200_101299/101211/01.09.01_60/tr_101211v010901p.pdf>.

* cited by examiner

VIRTUAL HOME CHANNEL FOR MOBILE BROADCAST NETWORKS

RELATED APPLICATIONS

This application claims the benefit of priority to U.S. Provisional Patent Application No. 61/264,147 entitled "Virtual Home Channel for Mobile Broadcast Networks" filed Nov. 24, 2009, the entire contents of which are hereby incorporated by reference.

BACKGROUND

Wireless communication technologies have seen explosive growth over the past few years. A recent addition to wireless communication technologies has been the ability to broadcast programs to mobile users. Mobile broadcast users can view mobile editions of news, entertainment, sports, business, and other programming using their cell phone or other wireless devices. These broadcast systems have seen significant increase in usage and availability worldwide. However, mobile broadcast networks face issues not shared by broadcasters to fixed receivers, such as conventional television sets.

SUMMARY

The various embodiments encompass methods and systems for providing a virtual home channel that can be deployed in multi-frequency broadcast networks to enable mobile receivers to quickly determine available channels and content.

In an embodiment a method for communicating broadcast metadata for a plurality of multi-frequency broadcast networks may include receiving metadata for each of the plurality of multi-frequency broadcast networks, and broadcasting metadata for a local one of the plurality of multi-frequency broadcast networks and at least a portion received metadata of one other of the plurality of multi-frequency broadcast networks to provide a virtual home channel. The plurality of multi-frequency broadcast networks may be within markets of different geographic area and carry local content. The metadata may be broadcast using a File Delivery over Unidirectional Transport (FLUTE) protocol. Metadata may be broadcast according to a staggered cyclic pattern configured to reduce temporal domain service overlap, or synchronized in time among the plurality of multi-frequency broadcast networks such that the metadata broadcasts can be used by receiver devices to evaluate potential reception as supported in a physical layer. Metadata may be collected in a central metadata aggregation server, which may determine portions of the metadata received from the plurality of multi-frequency broadcast networks that should be broadcast. The determined portion may be substantially all of the received metadata, a subset of the received metadata, and/or metadata for a particular network within a market which broadcasts at least a portion of all metadata for all networks within the market. The determination may take into account geographic considerations, such as location and/or shapes of reception areas of the networks, locations of transmitters with respect to adjacent networks, etc., as well as the nature of the metadata broadcast in adjacent networks. The determined portion of received metadata to be broadcast may include one or more of a list of network frequencies, physical layer parameters used by transmitters to encode broadcast waveforms, program guide data, subscribable services, data download schedules, a transmitter color or group identifier, a metadata sequence number, etc. The determination may be for a particular one of the plurality of multi-frequency broadcast networks, and include generating a metadata package for the one or more of the plurality of multi-frequency broadcast networks, and transmitting the generated metadata package to the one or more of the plurality of multi-frequency broadcast networks for broadcast. Alternatively, the determination may be for each of the plurality of multi-frequency broadcast networks, and may include generating respective metadata packages for each of the networks, and transmitting the generated respective metadata packages to each of the networks for broadcast. The embodiment methods may be implemented in a server or similar computer configured to perform the operations of the methods with computer-executable instructions, which may also be stored on a non-transitory computer-readable storage medium.

In another embodiment, a method for conducting a handoff from one multi-frequency broadcast network to another in a receiver device may include acquiring metadata from a broadcast by a local multi-frequency broadcast network including metadata for another multi-frequency broadcast network, using the metadata for the other multi-frequency broadcast network to prepare to perform a handoff to a different network, determining when a handoff should be accomplished, and accomplishing the handoff to the different network, which may be the other multi-frequency broadcast network. In this method the receiver device may use the metadata for another multi-frequency broadcast network to select the different network from a plurality of networks in a market, such as by determining whether the received metadata is similar to metadata received from the local multi-frequency broadcast network. An implicit handoff may be accomplished to the same or similar content when the received metadata is similar to metadata received from the local multi-frequency broadcast network. The receiver device may use the metadata for the other multi-frequency broadcast network to prepare to perform a handoff to that network by using the metadata for the other multi-frequency broadcast network to receive the other multi-frequency broadcast network, receiving a metadata broadcast from the other multi-frequency broadcast network, and using the metadata broadcast received from the other multi-frequency broadcast network to select the different network from a plurality of networks in a market, which may include selecting one of the plurality of networks in the market which broadcasts similar service metadata. The receiver device may use the metadata broadcast received from the other multi-frequency broadcast network to select the different network by: selecting one of the plurality of networks in the market for which broadcast metadata includes a unique content identifier that matches a unique content identifier of content currently being received; selecting one of the plurality of networks in the market for which broadcast metadata exactly matches one or both of service data and multiplex details of from the local multi-frequency broadcast network; selecting one of the plurality of networks in the market for which broadcast metadata includes provisioning of physical layer configurations which match those of the local multi-frequency broadcast network; selecting one of the plurality of networks in the market for which broadcast metadata includes provisioning of physical layer configurations which the receiver device can receive; or selecting one of the plurality of networks in the market broadcasting a content currently being received for which broadcast metadata includes provisioning of physical layer configurations that the receiver device can receive. Using the received metadata broadcast may enable the receiver device to achieve faster power up acquisition, and faster recovery from loss of signal conditions. The embodiment methods may be implemented in a processor of a receiver device configured to perform the operations of the methods with processor-executable instructions, which may also be stored on a non-transitory processor-readable storage medium.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
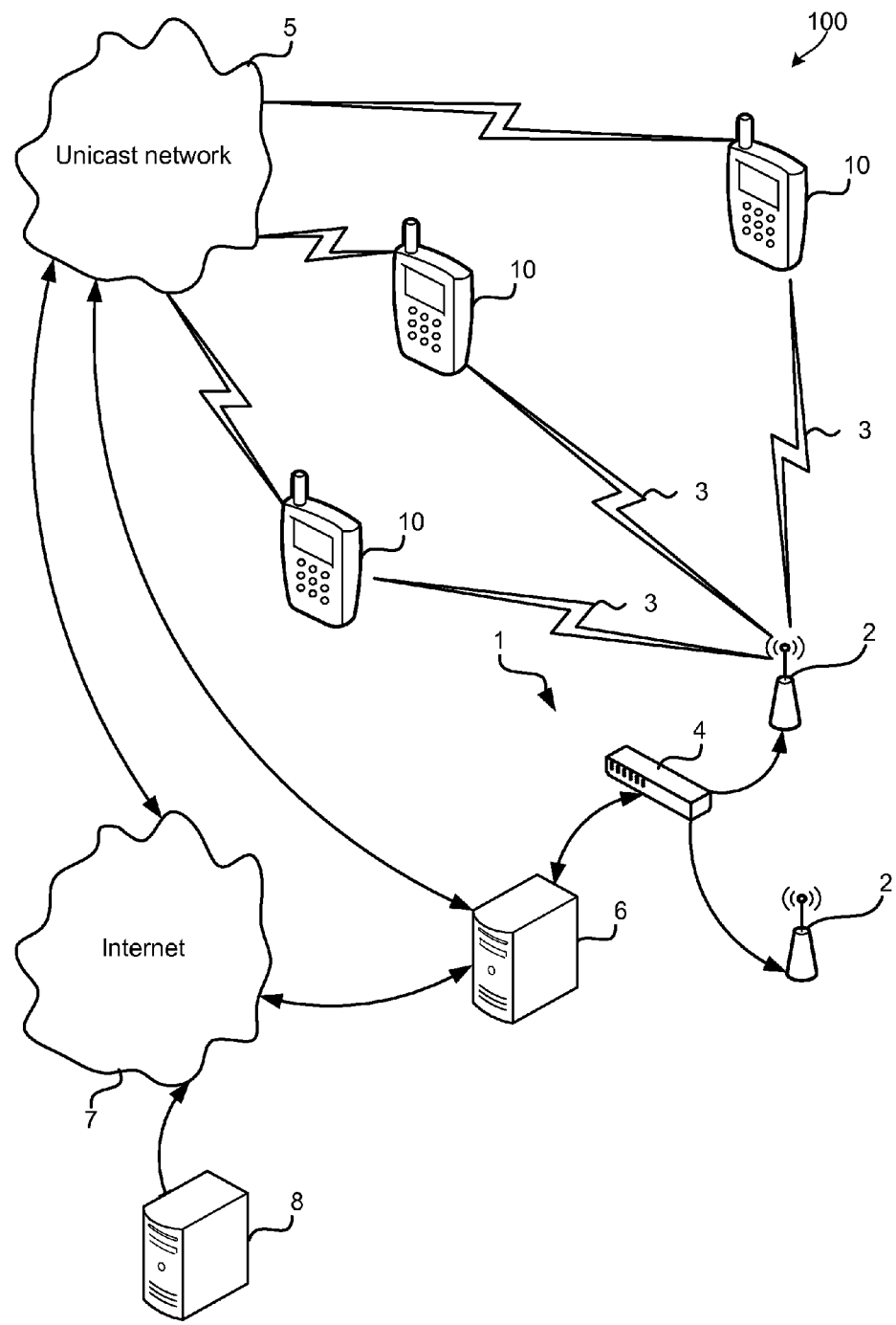
FIG. 1 is a communication system block diagram illustrating a mobile TV broadcast communication system suitable for use in an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" refers to any one or all of cellular telephones, mobile multimedia receivers, personal television receivers, mobile television receiver devices, personal data assistants (PDA's), palm-top computers, lap-top computers, wireless electronic mail receivers (e.g., the Blackberry® and Treo® devices), multimedia Internet enabled cellular telephones (e.g., the Blackberry Storm®), Global Positioning System (GPS) receivers, and similar personal electronic devices which include a programmable processor and memory and mobile TV broadcast receiver circuitry for receiving and processing mobile TV broadcast transmissions.

As used herein, "network" refers to an affiliated group of transmitters that radiate the same waveform to form a local area single frequency network is a network. A single transmitter is a proper subset, i.e., a single transmitter can form a "network."

As used herein, "market" refers to a market is a major metropolitan area, DMA, or just a continuously developed area. In general a market is a geographic area that can be treated a single entity from a media consumption perspective.

The word "broadcast" is used herein to mean the transmission of data (information packets) so that it can be received by a large number of receiving devices simultaneously.

A number of different mobile TV layer technologies and related standards are available or contemplated in the future, all of which may implement and benefit from the various embodiments. Such standards include Open Mobile Alliance Mobile Broadcast Services Enabler Suite (OMA BCAST), MediaFLO, Digital Video Broadcast IP Datacasting (DVB-IPDC), and China Multimedia Mobile Broadcasting (CMMB). The various embodiments are generally applicable to broadcast television networks that have an embedded mobile television component or mobile multimedia components. In particular, the embodiments may be useful with ISDVT, ATSCMH and DVDT standard networks. The embodiments are useful with mobile television components, since traditional terrestrial television receivers are fixed in one location they do not experience varying broadcast characteristics, such as broadcast channels that can be received in particular areas. However, when television receivers are configured in mobile devices, such as in the form of handheld and automobile television receivers, the receivers will encounter different broadcast networks as they move about the country. For example, the television stations and programming available in one city may be partially or completely different from those in the next city. Therefore, mobile television receivers must have some capacity for discovering the stations that are applicable to a receiver in a particular location.

Conventional methods employed by mobile receivers for determining the content available in a market call for the device to discover the information, such as by tuning to all available channels or content flows. In some mobile television networks it could be possible to deploy a wide area single frequency network that would be available in all or most markets to provide common information about the services available in the same general area or market. Such a concept has been described in U.S. patent application Ser. No. 12/417,520, entitled "Methods And Apparatus For Aggregation Of Guide And Frequency Map Information For Multiple Frequency Networks Using Upper-Level Single Frequency Network" filed Apr. 2, 2009 which published as U.S. Patent Publ. No. 2009/0253415, the entire contents of which are incorporated by reference. However, the existence of a single frequency network in all markets to support a network of multiple frequency networks is not assured, and it is desirable for the multiple frequency networks to be self supporting.

Multi-frequency networks are configured to enable mobile devices to be self-contained by broadcasting information about the programs and content that will be broadcast in the future via a portion of broadcast transmissions dedicated to carrying overhead information. Such information broadcasts are often referred to as "metadata," an "overhead flow" or a "content description flow." Such metadata broadcasts are separate from the portions of the broadcast transmissions that carry the content (referred to herein as "content flow").

Mobile devices can also process this metadata to provide users with an electronic viewing guide. Such an electronic viewing guide, which is known in some mobile TV formats as a "service guide" (SG) or "electronic service guide" (ESG), is a viewable program guide similar to that available on cable and satellite television systems. These service guides typically contain fixed pricing information which informs potential subscribers (also referred to as users) of the cost to view the broadcast content.

Example components of a typical mobile TV broadcast system 100 are illustrated in FIG. 1. A mobile TV broadcast network 1 typically includes a plurality of broadcast transmitters 2 controlled by a mobile broadcast network control center 4. The mobile TV broadcast network 1 broadcasts content from the broadcast transmitters 2 as mobile broadcast transmissions 3 for reception by mobile devices 10. Within the mobile broadcast network control center 4 will typically be one or more network servers 6 which may be configured to manage the scheduling of content broadcasts, generation of electronic service guides and other metadata regarding the content broadcasts, as well as exchange information with other networks and generate metadata messages for broadcast via the mobile TV broadcast network 1. The one or more network servers 6 may be coupled to an external network, such as the Internet 7, through which the network server 6 may receive content feeds from content provider servers 8 and exchange information with other networks.

Transmitters within a single network or across multiple networks may use different physical layer parameters for transmitting content efficiently. For example networks may use different physical layer parameters if transmitters are broadcasting content on different frequencies, or if transmitters are required to broadcast content using different transmit powers due to transmit power regulations in certain areas and/or on certain frequencies. Such physical layer parameters may include parameters like Fast Fourier Transform (FFT) size, cyclic prefix length, and slot-to-interlace mapping in an orthogonal frequency domain multiplexing (OFDM) communication system (e.g., MediaFLO). A mobile receiving device may only support decoding radio frequency (RF) transmissions using a subset of such physical layer parameters. As an example, a mobile device may only support decoding RF waveforms broadcast with 4K FFT mode and a ⅛ cyclic prefix length. In order to receive broadcast transmissions, mobile receiving devices must determine the physical layer parameters used by the local broadcast network or networks. Such physical layer parameters are typically broadcast in a metadata signaling channel, overhead flow or service, or other overhead portion of the broadcast signal of each network.

Figure 2A:
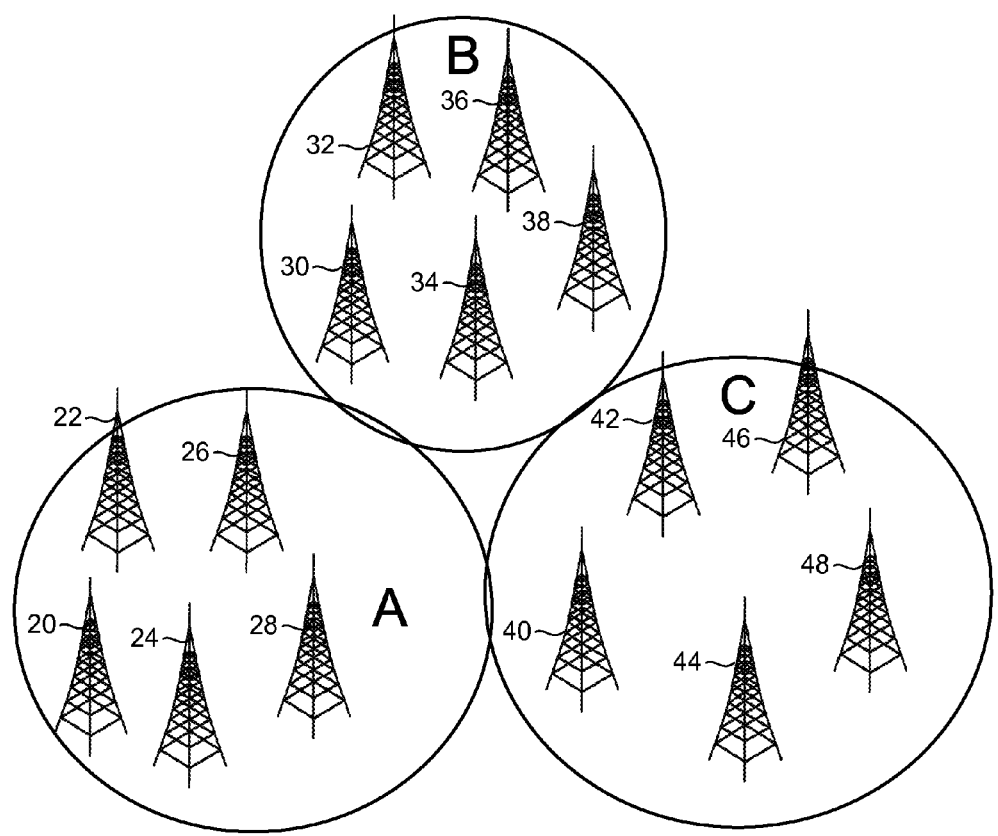
FIGS. 2A and 2B illustrate three adjacent markets each including a plurality of networks.

FIG. 2A illustrates the situation that may be encountered when there are multiple markets A, B, and C of multiple multi-frequency networks 22-48 providing shared or independent content support in multiple markets. Within each market A, B, C there may be multiple multi-frequency networks 22-48, that may be cooperating within the market. If there is no upper layer single frequency network to describe the content (programming or services) available in the respective markets or not in all markets, mobile receivers traveling from one market to another or traveling between different network coverage areas will be on their own to find and acquire metadata for each network.

Typically, there is no central repository or resource for distribution of programming, frequency plans or other metadata among different networks. Each multi-frequency network broadcasts its own metadata about its services. As a result, it is the responsibility of the mobile receiver device to discover the frequency or channel of the metadata broadcasts within each market. However, a receiver device cannot be certain that it is aware of all available sources and programs, and therefore has to continually search for new stations. This has undesirable effect on power consumption, which reduces battery life and makes the acquisition of service slower than it need be.

The various embodiments overcome these limitations of conventional multi-frequency networks by providing a virtual home channel that mobile receiver devices can receive in every network to efficiently obtain the information needed to begin receiving content from a particular network. The embodiments provide a mechanism for aggregating information from adjacent multi-frequency networks and broadcasting the aggregated information in a standardized format (i.e., frequency, encoding schemes, etc.) that all mobile receiver devices can access. The aggregated information broadcasts in a standard format provides a virtual home channel for each multiple frequency network of otherwise unrelated networks. Mobile receiver devices traveling from one network to another need only access the virtual home channel in order to be able to quickly receive all content and services in the new network. The commitment on the part of each network required by the embodiments is to provide its metadata to other networks, and to broadcasting the metadata of other networks that are members of an aggregate of participating networks.

Figure 2B:
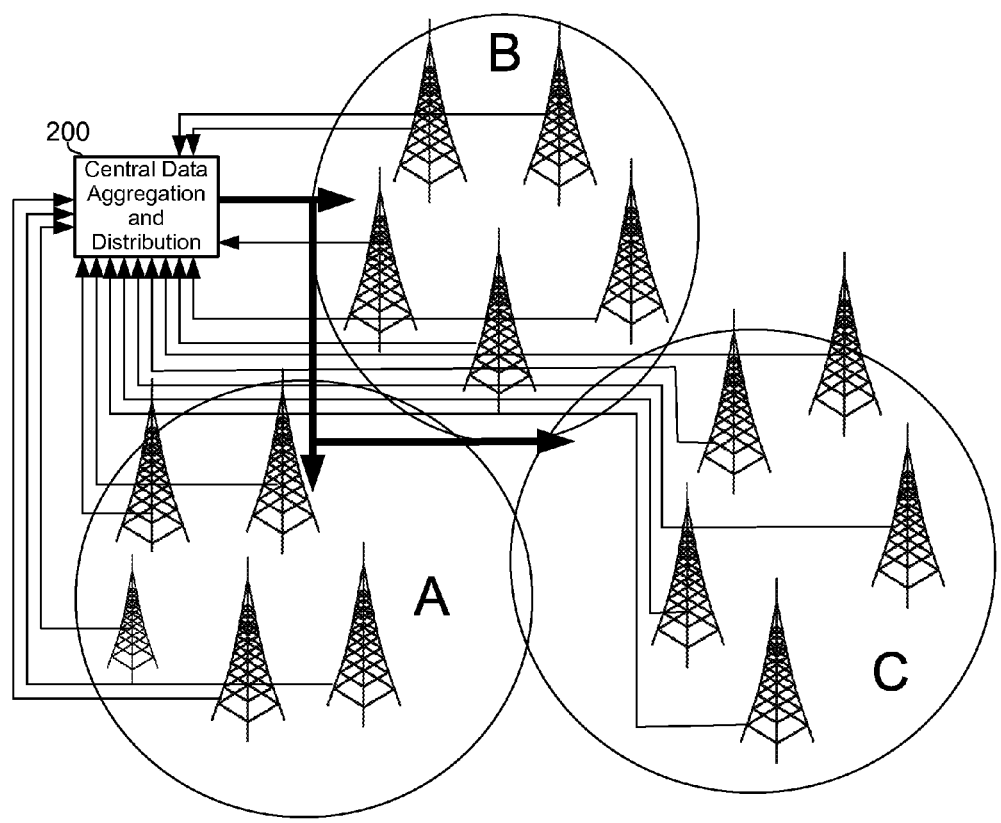

FIG. 2B illustrates an embodiment of the virtual home channel in which markets A, B, and C exchange metadata with each other, and broadcast each other's metadata on the virtual home channel. The purpose and benefit of such an organization of participating networks is to allow mobile receiver devices traveling from one market to another, or located near the boundary of two markets, to know the network metadata of the adjacent markets. Broadcasting the metadata of adjacent markets allows mobile receiver devices to quickly find services from another network in an adjacent market.

The usefulness of the virtual home channel to mobile receiver devices is illustrated by the situation that can frequently arises when a user is receiving a particular content or program from one network while moving into the coverage area of an adjacent network or market. In order to continue to receive the same content or program, the mobile receiver device must determine the channel, station or flow carrying the same content and the adjacent network or market, and begin receiving the content or program upon entering the new coverage area. Such a switch of a content or program source from one network to the next that is performed in the mobile receiver device is referred to herein as a "handoff." To provide a better user experience, such a handoff should result in minimal disruption of the displayed content or program. Optimally, a user may not notice when the source of a program being viewed switches from one network or market to another. Such a seamless handoff of services is typical of cellular telephone communication networks, so users are likely to expect similar performance from their mobile multimedia receiver devices.

However, such a handoff between networks and markets may involve a complex process. As noted above, transmitters within networks or across multiple networks and markets may use different physical layer parameters for transmitting content. Further, adjacent markets that broadcast the same content or program may do so on a different frequency, channel or content flow. Thus, in order for a mobile receiver device to complete a handoff operation for a particular content or program, the device must determine the physical layer parameters used by the adjacent transmitter, network or market, as well as determine the frequency, channel or content flow carrying the current content or program (if that content or program is carried at all). Then, using this information, the mobile receiver device must switch internal configurations and begin receiving the content or program on the new frequency, channel or content flow. Methods for conducing handoffs in multi-frequency networks are disclosed in U.S. Patent Publ. Nos. US2008/0253331 published Oct. 16, 2008; US2009/0010225 published Jan. 8, 2009; US2009/0016380 published Jan. 15, 2009; US2009/0197604 published Aug. 6, 2009; and US2009/0274119 published Nov. 5, 2009.

If the mobile receiver device must discover the physical layer parameters of the adjacent transmitter, network or market before completing the handoff, this time-consuming process may require an annoying break in reception. Even if a content or program is not being viewed at the time of the transition from one transmitter, network or market to the next, the mobile receiver device must still discover the transmitters from which it can receive content and generate an electronic viewing guide for those transmitters or networks that it can receive so that the device is ready when a user would like to access content. Without the virtual home channel, a mobile receiver device may need to switch to receiving the RF signals in the adjacent network and read the waveform to discover the physical layer parameters, and then determine if the device can decode the rest of the platform. This discovery process will lead to additional delay in acquiring desired content and the mobile receiver device may exhibit a gap in the display of the content from another suitable network while it is trying to determine suitability of an RF transmission which cannot be decoded based on the device capabilities.

To enable quick and efficient handoff between networks and markets, the various embodiments enable physical layer parameters used by adjacent transmitters to be included in the metadata broadcast on the virtual home channel. Mobile receiver devices can then tune to the virtual home channel when they are in the vicinity of a coverage boundary to determine whether an adjacent frequency is suitable for handoff based on device knowledge of the types of waveforms it can decode. Mobile receiver devices can create a handoff set by filtering only those frequencies which can be decoded by the receiver. Certain networks broadcast physical layer parameters used by transmitters at known locations in the waveform itself, using a fixed set of known parameters (e.g., FLO network). In the case where no physical layer parameters are specified for adjacent networks in the virtual home channel metadata, a receiving device will need to switch to receiving the RF in the adjacent network and read the waveform to find out the physical layer parameters, and then determine if the device can decode the rest of the platform. Again, this may lead to additional delay in acquiring desired content and the receiving device may miss acquiring the content from another suitable network while it is trying to determine suitability of an RF which cannot be decoded based on device capabilities.

The embodiment illustrated in FIG. 2B includes a central aggregation and distribution center 200 that can receive metadata from transmitters and markets, and aggregate the data for broadcast on virtual home channels within each of the participating markets A, B, C. The data aggregation can be achieved using a number of different methods. In an embodiment, the central aggregation and distribution center 200 may include a central aggregation server coupled to the Internet or a private network, which accepts or acquires the required metadata from the various network/market participants (thin arrows) and forwards the compiled metadata to the participating networks for broadcast (thick arrows). In an embodiment, one or more of the participating networks may maintain the central aggregation and distribution center 200. In another embodiment, a third party not associate with any of the participating networks may collect the metadata from all broadcast networks and maintain the central aggregation and distribution center 200 and metadata database.

The compiled metadata may comprise a reduced portion or subset of the metadata received from the participating networks so that the compiled metadata that that is broadcast on the virtual home channel does not carry the full metadata of all networks/transmitters. The complete metadata sets that are broadcast may be for the local or core network and a core or central reporting network in adjacent markets, depending on the specified role of each network. The members of a given market need to report or provide access to their market and their metadata to the central aggregation and distribution center 200.

Some broadcast networks may implement different sets of metadata within the same network, such as to address different markets or geographic regions. For example, a broadcast network in the San Francisco Bay area may implement one set of metadata associated with broadcast transmissions from the network in the northern portion of the broadcast network and a different set of metadata associated with broadcast transmissions from the network in the southern portion of the broadcast network. Transmitters along the boarder between the two regions within the same network may broadcast the content of one area and the metadata of the other area. For example, a transmission site in San Jose station might broadcast the South Bay content plus the North Bay metadata. Thus, overlapping continuously developed areas may have multiple home channels and transmitters with in such areas may broadcast a virtual home neighbor list.

One solution to the lack of a home channel is to aggregate all the service provider metadata together and transmit it from all networks. A subset of the market area transmitters that achieve coverage over the entire market area is a possible alternative to carrying all networks metadata on each network. It is often the case that multiple transmitters share a common tower or transmit site. In that circumstance only one of the transmitters per transmit site may need to carry the broader set of metadata, assuming that the coverage areas of all the transmitters are similar. When some subset of the transmitters broadcasts the full market metadata, all participating networks should, as a minimum, transmit the metadata that allows rapid acquisition of the full market metadata. Thus, when any market metadata transmission is found by a receiver device, all networks can be rapidly discovered.

In an embodiment, only the minimum metadata may be supplied for all of market networks. In this embodiment, broadcasts of complete metadata may be restricted to the in-market networks with no loss of functionality.

The organization of markets is nominally an administrative function, although the organization may be accomplished based on the radial distance from a primary transmitter, per network. Such a primary transmitter may be the transmitter that broadcasts the virtual home channel within a particular market.

Figure 3:
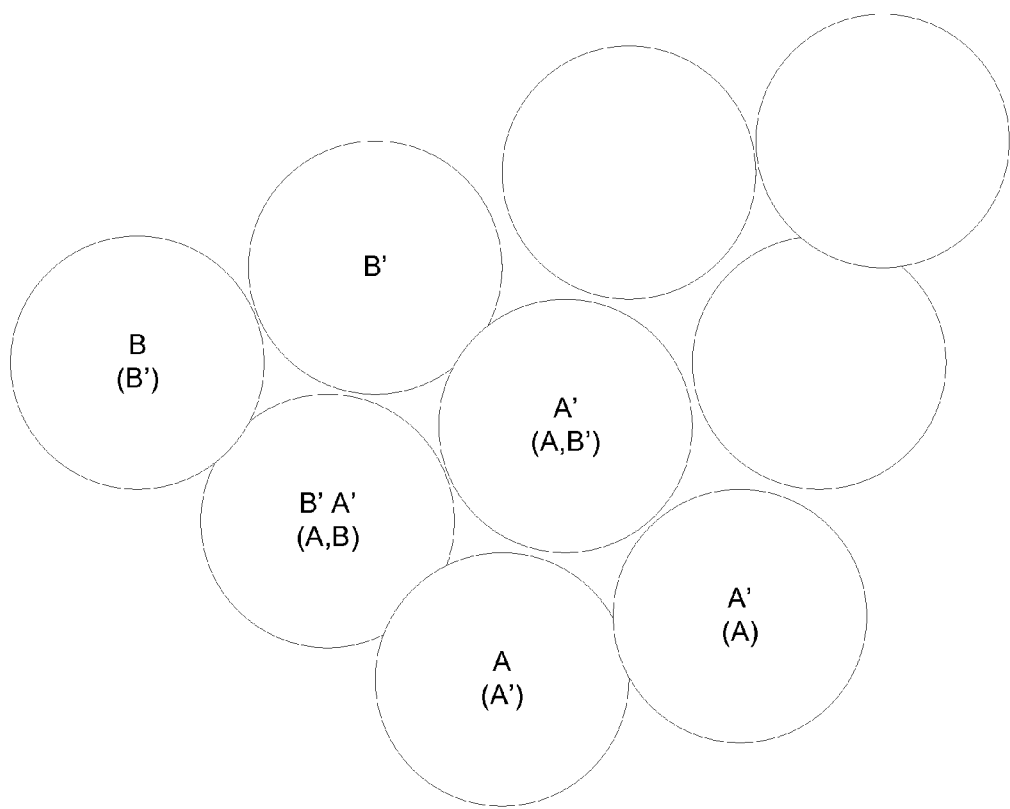
FIG. 3 illustrates an organization of the data sharing rules according to an embodiment.

FIG. 3 illustrates an example formation of neighboring groups of markets. In this organization, the neighbors of market A are the A' markets, and the neighbors of market B are the B' markets. In this organization, the metadata of the A' markets may be included in the metadata broadcast of the A market, as shown in the parenthesis. Thus, a receiver device in the A market would also receive metadata from or pertinent to the A' markets. Similarly, the metadata broadcast in the B market may include metadata from the B' markets, as shown in the parenthesis. Similarly, the metadata broadcast in markets bordering both A and B markets, namely A'B', may include the metadata for both markets A and B, as shown in the parenthesis. Thus, in this embodiment, each market may broadcast metadata comprising its own metadata and the metadata of its immediate neighbors. This embodiment would enable a mobile receiver device traveling (e.g., in an automobile, bus or train) among markets to seamlessly conduct handovers at any given time it is receiving the metadata of its current market and any adjacent market to which it may travel.

While FIG. 3 and the preceding paragraph describe two subsets of metadata that may be broadcast in some markets (i.e., subsets A' and B'), this embodiment may be applied to any number N of subsets of metadata, such as N sets of metadata for the N nearby networks or markets.

It should be noted that FIG. 3 illustrates just one potential embodiment organization. In another embodiment organization, which may be useful particularly in certain densely populated regions such as Southern California, all metadata of all networks and markets within a large continuously developed area may be broadcast in all markets in the area. This embodiment would enable a mobile receiver device to seamlessly conduct handovers anywhere within the continuously developed area since it would be receiving the metadata for all networks and markets within the region.

In a further embodiment, the determination of the neighbors of each market can be made automatically by the aggregation center 200 if each network provides to the central aggregator server an appropriate description of its coverage area. This coverage area description may be in the form of a circular area (e.g., a central coordinate and a radial measurement) when the network transmitter has a single omni-directional antenna. Alternatively, the coverage area description may be in the form of a polygon encompassing the coverage area (e.g., a series of coordinates identifying the corners of the polygon) as may be appropriate in more complex scenarios of multi-transmitters and directional antennas. The central aggregator 200 may use the coverage area descriptions received from participating networks to construct the neighbor list of each network based on coverage area intersections and/or the distances between network coverage areas. This construction of the neighbor list may be accomplished automatically according to an algorithm implemented on an aggregator server. For example, a neighbor of a network of interest may be any network that has intersecting coverage areas with the network of interest. As another example, two networks may be considered neighbors if the minimum distance between the closest two points in their coverage area (one point in each coverage area) is less than a threshold distance d.

In a variation of this embodiment, the amount of metadata provided regarding the adjacent markets may be a subset of the complete set of metadata. Thus, the metadata transmitted in a particular market may include a full set of metadata for that market plus a partial set of metadata for each of the adjacent markets (this is referred to below as a "full plus partial metadata scheme"). For example, the full set of metadata for the present market may include the frequency tables, guide data, and subscription data for all core market providers in the present market as may be provided in the core market. However, only the frequencies of the adjacent markets' channels where the complete metadata may be accessed may be included in the partial metadata broadcast in other markets. Thus, receiver devices receiving the partial metadata of adjacent networks and markets are informed of the particular transmitter or network that the device can access in order to obtain the complete metadata set for that network or market. Knowing where to tune for the complete metadata can save the receiver device a significant amount of discovery time during a handoff process.

The more nuanced and efficient the implementation is, the more an administrative function may be required to assure that the aggregate of networks functions effectively and efficiently. This is a primary advantage of the embodiment of all networks carrying all detailed core market metadata.

Certain networks within a given market or in adjacent markets may be suitable for handoff, i.e., the content on the handoff candidate network is the same or similar to that in the currently accessed network. This may be determined explicitly or implicitly by a receiver device. For example, the current metadata about a program may be the same or similar (implicit) to that of the handoff candidate network. As another example, the specific ID of a program, such as the ISAN, may be identical to (i.e., it matches) that of a program in the handoff candidate network. In some situations, the structure of the data multiplex may be the same and identify the same multiplex. For services that are under common conditional access control, it is likely that the service description will be identical. In this situation, only the service identifier need be included in the metadata to allow an effective handoff by mobile receiver devices. The IP addresses or flow IDs may be included in the per network service definition.

Certain physical layers have defined temporal structures that can allow a receiver device to tune to the handoff candidate and see if the handoff candidate can be received, with no need for coordination among the transmitters (such as FLO physical layer). Other physical layers require some level of relative transmit time synchronization in order to accomplish handoff candidate evaluation and sustained reception on a current physical channel. The suitability and synchronization data may be included in the provided metadata on the virtual home channel. This information may be in the form of a group number or color code that the receiver devices can receive and evaluate. The concept of a group or color may be applied to the temporal organization. For example, the same multiplex may be carried in four different temporal organizations that are non-overlapping in the time domain, such that the receiver device can potentially acquire the same multiplex from multiple carriers. This is an abstraction relative to an explicit description of location in time-frequency space, such as practiced in the MediaFLO physical layer. This creates the possibility of achieving coverage over an entire market via an intra-market multiple frequency network of collaborating networks, and the extension of the same concept across multiple markets. Assuming that the same media logical channels (MLCs), parades, or multiplexes can be received on multiple carriers, baseband packet combining—as practiced in CDMA networks—can applied, allowing for a "soft handoff."

In a further embodiment, the aggregation function may be distributed so that the reception and assembly of aggregate metadata packages can be accomplished by participating networks and transmitters without the need for a centralized aggregator. In this embodiment, each network may make their metadata available to other networks and markets, such as by posting their metadata in a commonly accessible database or on a commonly accessible Internet website, or by listening in to the metadata broadcasts of nearby networks and transmitter sites.

In a further embodiment, a common (shared) software solution that executes a rule based combination of each network's metadata may be installed at some or all transmit sites so that each site can produce its own version of the common metadata for a virtual home channel using the same rule set (software). In this embodiment, all sites may publish their unique metadata for the use of other members, such as by exchanging metadata periodically, storing their metadata on a commonly accessed database (i.e., a database accessible by all transmitter sites), or posting their metadata on a commonly accessed website. Common configuration control would be necessary to assure that there is no version or configuration skew among the participating transmit site. For example, the market definition and participation list may require manual configuration, such as at a time of initialization or network configuration. The full plus partial metadata scheme of the embodiments described above may be executed in this embodiment as well as through proper configuration of the common rule set, although the designation of a full plus partial metadata scheme may be manually administered.

In a further embodiment, the respective transmitter sites and networks may listen to each other over the air to receive their respective metadata broadcasts, and use the received metadata as received, including sequence numbers and start times from each of the networks. Received metadata then may be applied to commonly implemented rules (software) to generate aggregate metadata for broadcast. This method of sharing metadata over the air assumes that the various networks can receive each other's transmitter signals (i.e., transmit sites are within each other's coverage areas, at least at the height of the transmission tower). However, this is not a strict requirement, since the various networks could be allowed to copy aggregated metadata from other member networks, including the metadata from distant networks.

The market composition is treated generally herein as if it is an administered definition in which the areas have been defined and agreed to by all participants. However, this is not a hard requirement. The determination of carriage of metadata may be made by a rule, such as every transmitter within 90 miles of the primary network transmit site is included. The location of the primary transmitter may be published by each network, such as on an Internet site accessible by all market participants and mobile receiver devices. The advantage of identifying a primary transmitter within a market is that such information may allow a user to select particular markets of interest. For example, the identification of a market by location services based upon GPS information may be useful.

Figure 4:
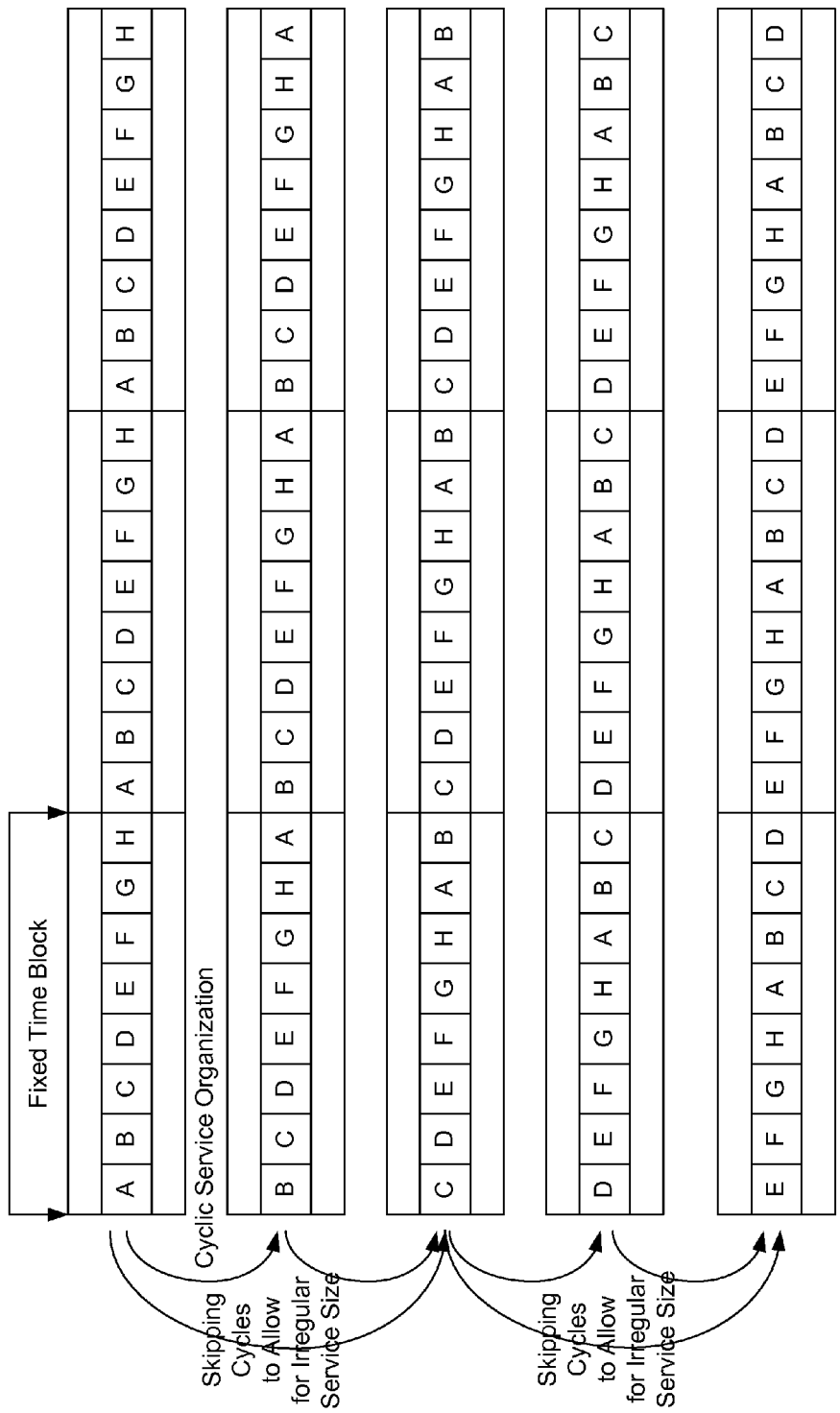
FIG. 4 illustrates a cyclic service organization and cycles skipping method to allow a regular sized metadata package to be transmitted by adjacent networks without overlapping the temporal domain.

In a further embodiment, the broadcast of aggregate metadata by the various networks and markets may be synchronized and staggered in time across the participating transmitters so that the metadata is always available for reception even in locations of overlapping coverage area. By staggering start times in a cyclic fashion as illustrated in FIG. 4, the participating networks can avoid transmitting the same metadata elements simultaneously, in other words, causing service overlap in the temporal domain. The staggering may also be accomplished in terms of one of four phases in time. In some embodiments, the four time phases may be referred to in terms of colors, such that there may be four colors/phases of broadcast metadata that receiver devices can receive. The staggering start times can be further enhanced by skipping multiple services in the selection of the actual cyclic patterns to be used in order to further reduce the probability of service overlap in the temporal domain. To enable receiver devices to receive the staggered broadcast content, the metadata broadcast on the virtual home channel (e.g., multi-network metadata broadcast by one or more networks) may contain information regarding the staggering or time/phase delay implemented on each network.

Figure 5:
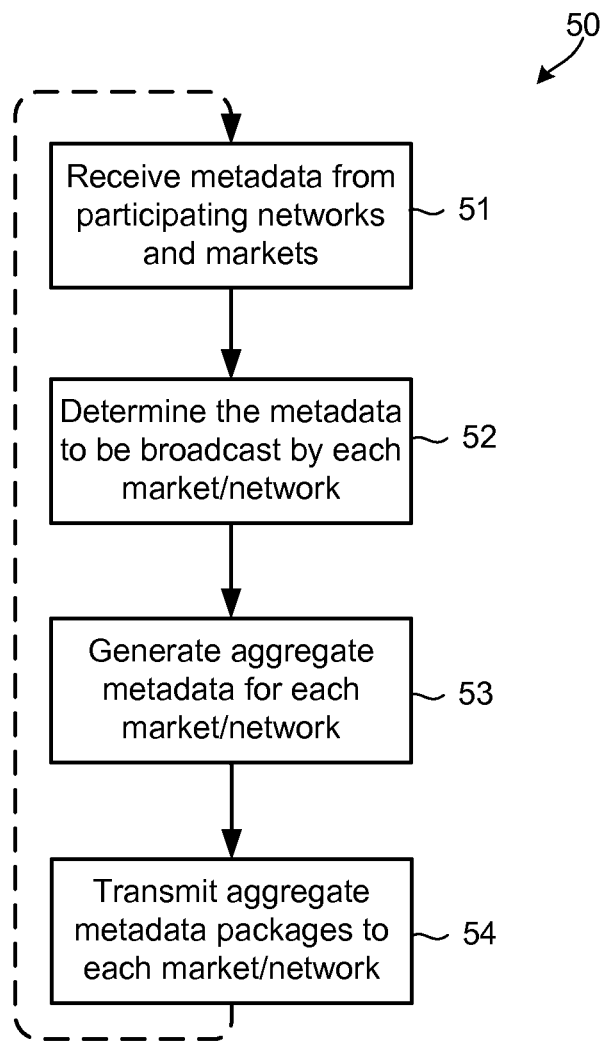
FIG. 5 is a process flow diagram of an embodiment method for aggregating metadata in an aggregator server.

FIG. 5 illustrates an example method 50 which may be implemented by an aggregator server for generating and transmitting aggregate metadata packages to participating markets as illustrated in FIG. 2B. In method 50 at step 51, an aggregator server may receive metadata from all of the participating networks and markets. Such received metadata may be stored in a local database so that participants need only transmit the data when the changes and the timing of metadata transmissions need not be coordinated. The aggregator server may then determine the particular metadata to be broadcast by each market or network participant in step 52. As discussed above, the metadata provided to each network market participant may vary depending upon the embodiment employed. For example, in one embodiment, all networks and markets will broadcast all of each other's metadata. In another embodiment, each network or market may transmit the metadata of just the adjacent networks and markets. In a further embodiment, only a portion of adjacent network metadata may be included in the aggregate metadata package for a particular network or market. The determination of metadata packages may take into account geographic location and coverage area in step 52 in some embodiments as described above. In an embodiment, the determination of the metadata selected for the broadcast system network or market participant may be determined in advance, such as in a network configuration initialization process, and thus step 52 may not be performed in real-time.

Once the metadata to be broadcast in each market or network is determined, the aggregator server may generate the individual aggregate metadata packages to be sent to each network or market participant in step 53. When the aggregate metadata packages are generated, they may be transmitted to each market and participating broadcast network in step 54. Such transmissions may be accomplished by any known communication technology, including dedicated networks and the Internet. In order to accommodate changes in metadata that occur from time to time, the process of receiving metadata (step 51), determining metadata for each network and market (step 52), generating aggregate metadata packages (step 53), and transmitting the packages to broadcast network participants may be repeated periodically (step 54) as illustrated by the dashed arrow.

Figure 6:
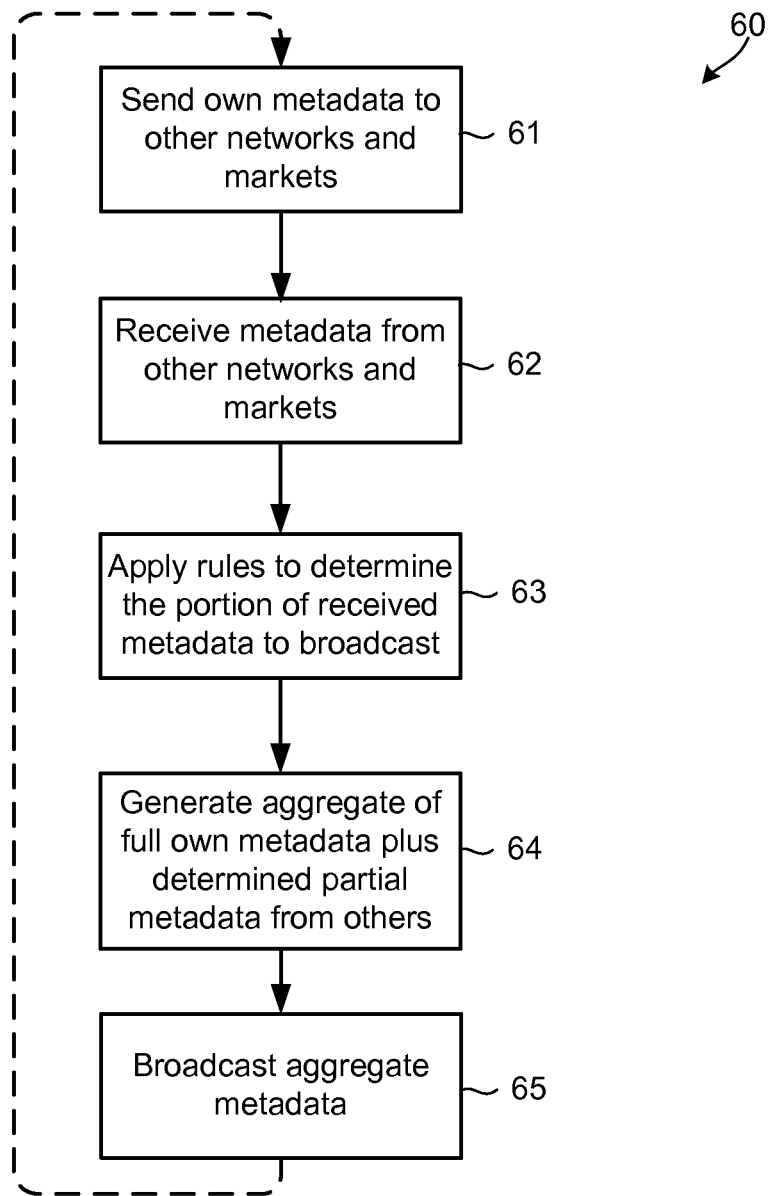
FIG. 6 is a process flow diagram of an embodiment method for aggregating metadata in individual network or transmitter servers.

FIG. 6 illustrates an example method 60 by which the metadata aggregation function may be accomplished in a distributed manner, such as by individual networks of transmitters. In method 60 at step 61, each network or transmitter may send out its own metadata to other participating networks and markets. Such transmission of metadata may be accomplished using any known communication technology, including dedicated networks and the Internet, and may also be accomplished through the normal broadcast of metadata. In implementations where the owner of metadata transmits its metadata to others, the transmission may be via a network technology, such as the Internet, and the metadata may be transmitted by a server within the network or transmitter. In step 62, a server within the network or transmitter may receive metadata from other networks and markets. In step 63, a server within the network or transmitter may then apply a common set of rules to the received metadata from others in order to determine the portion of received metadata to be broadcast. In step 63, the rules applied may be similar to those described above such that metadata from all or some (e.g., adjacent markets) network or market participants is broadcast, and all or a portion of other network or market metadata is transmitted. In step 64, the server may generate an aggregate metadata that includes both its own full metadata set, and the determined full or partial metadata from other networks and markets. In broadcast networks with different broadcast content—and thus different metadata—for different regions, the aggregated metadata may include metadata for each of the different regions. In step 65, the network or transmitter may then broadcast the generated aggregate metadata set in the ordinary manner.

In this method 60, the plurality of multi-frequency broadcast networks may be within markets of different geographic area and carry local content. Metadata may be collected in a central metadata aggregation server, which may determine portions of the metadata received from the plurality of multi-frequency broadcast networks that should be broadcast. The determined portion of the metadata for broadcast may be substantially all of the received metadata, a subset of the received metadata, and/or metadata for a particular network within a market which broadcasts at least a portion of all metadata for all networks within the market. The determination of metadata for broadcast may take into account geographic considerations, such as location and/or shapes of reception areas of the networks location of transmitters with respect to adjacent networks, etc., as well as the nature metadata broadcast in adjacent networks. The determined portion of received metadata to be broadcast may include one or more of a list of network frequencies, physical layer parameters used by transmitters to encode broadcast waveforms, program guide data, subscribable services, data download schedules, a transmitter color or group identifier, and a metadata sequence number. The determination of metadata for broadcast may be for a particular one of the plurality of multi-frequency broadcast networks, and include generating a metadata package for the one or more of the plurality of multi-frequency broadcast networks, and transmitting the generated metadata package to the one or more of the plurality of multi-frequency broadcast networks for broadcast. Alternatively, the determination of metadata for broadcast may be for each of the plurality of multi-frequency broadcast networks, and may include generating respective metadata packages for each of the networks, and transmitting the generated respective metadata packages to each of the networks for broadcast.

Figure 7:
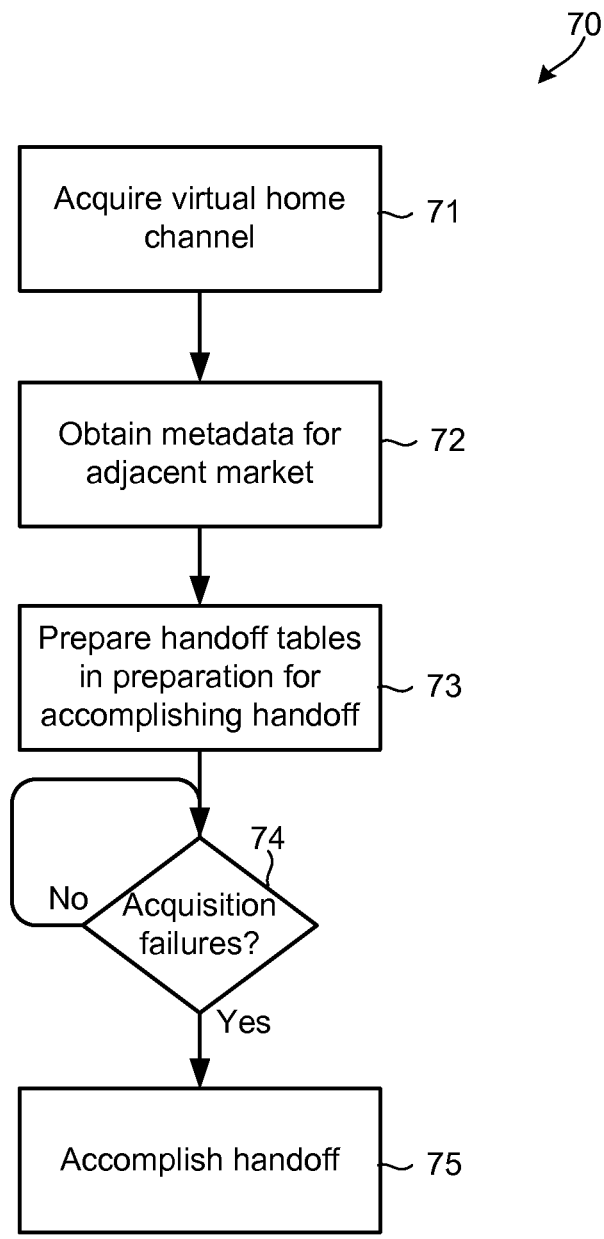
FIG. 7 is a process flow diagram of an embodiment method for accomplishing a hand off using information obtained from the virtual home channel.

FIG. 7 illustrates an example method 70 that may be implemented by mobile receiver devices in order to use information from the virtual home channel to accomplish efficient service handoff. In method 70 at step 71, the receiver device may acquire the virtual home channel, which may be broadcast in the form of an aggregate metadata message. The receiver device obtains the metadata for an adjacent network or market in step 72. The manner in which the receiver device obtains the metadata, and the portion of the metadata that is obtained, will depend upon the particular embodiment implemented in the broadcast system. Using the obtained metadata for the adjacent market, the mobile receiver device may prepare handoff tables and other information in preparation for accomplishing a handoff in step 73. The mobile receiver device may then monitor the reception quality, such as counting a number of acquisition failures which occur within a period of time, to determine when a handoff to an adjacent network or transmitter should be accomplished, determination step 74. When sufficient acquisition failures are experienced to indicate that a handoff should be accomplished (i.e., determination step 74="Yes"), the mobile receiver device may accomplish the handoff using the information obtained from the metadata in step 75. Methods for preparing for and conducting handoffs in a multi-frequency network are disclosed in the U.S. patent applications listed above.

In this method 70 the receiver device may use the metadata for another multi-frequency broadcast network to select the different network from the plurality of networks in the market, such as by determining whether the received metadata is similar to metadata received from the local multi-frequency broadcast network. An implicit handoff may be accomplished to the same or similar content when the received metadata is similar to metadata received from the local multi-frequency broadcast network. The receiver device may use the metadata for the other multi-frequency broadcast network to prepare to perform a handoff to that network in step 73. This hand off may be performed by using the metadata for the other multi-frequency broadcast network to receive the other multi-frequency broadcast network, receiving a metadata broadcast from the other multi-frequency broadcast network, and using the metadata broadcast received from the other multi-frequency broadcast network to select the different network from a plurality of networks in a market. This selection may include selecting one of the plurality of networks in the market which broadcasts similar service metadata.

The receiver device may use the metadata broadcast received from the other multi-frequency broadcast network to select the different network in a number of ways. In one method, the receiver device may select one of the plurality of networks in the market for which broadcast metadata includes a unique content identifier that matches a unique content identifier of content currently being received. In another method, the receiver device may select one of the plurality of networks in the market for which broadcast metadata exactly matches one or both of service data and multiplex details of from the local multi-frequency broadcast network. In another method, the receiver device may select one of the plurality of networks in the market for which broadcast metadata includes provisioning of physical layer configurations that match those of the local multi-frequency broadcast network. In another method, the receiver device may select one of the plurality of networks in the market for which broadcast metadata includes provisioning of physical layer configurations that the receiver device can receive. In another method, the receiver device may select one of the plurality of networks in the market broadcasting a content that is currently being received for which broadcast metadata includes provisioning of physical layer configurations that the receiver device can receive. Using the received metadata broadcast may enable the receiver device to achieve faster power up acquisition, and faster recovery from loss of signal conditions.

Figure 8:
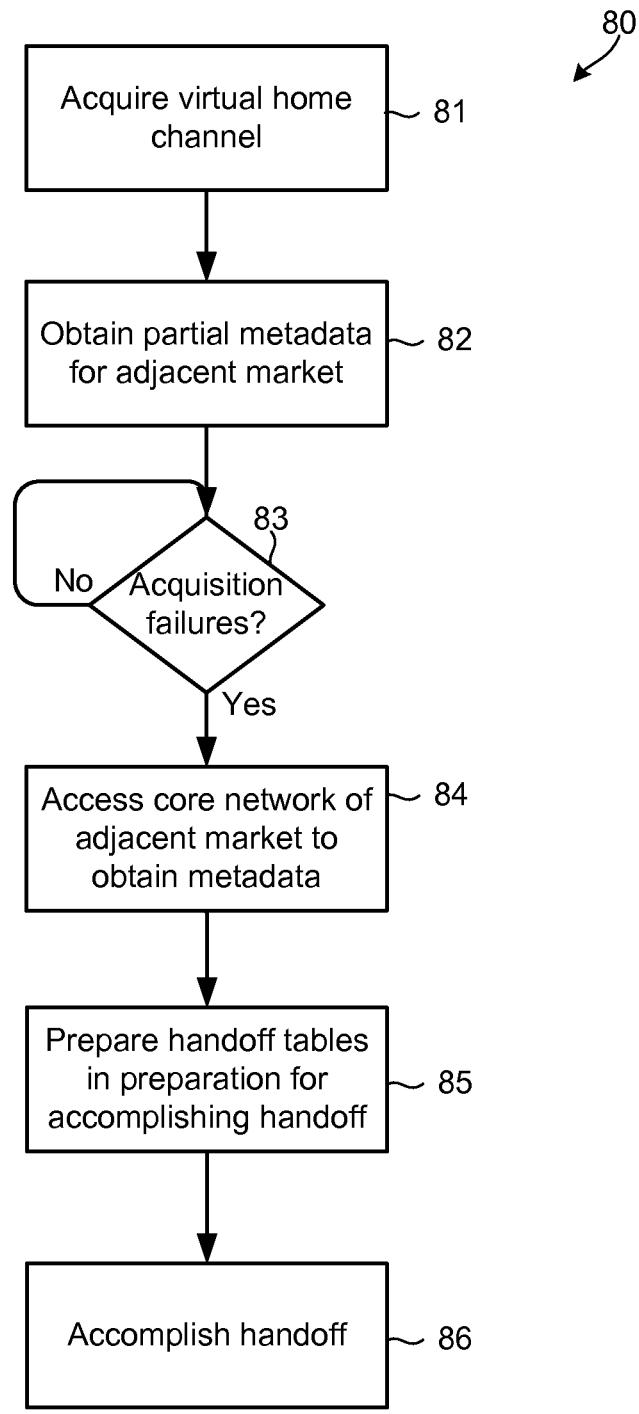
FIG. 8 is a process flow diagram of another embodiment method for accomplishing a hand off using information obtained from the virtual home channel.

FIG. 8 illustrates another example embodiment method 80 by which mobile receiver devices may conduct a handoff in network embodiments in which only a portion of adjacent network metadata is provided in the virtual home channel. In method 80 at step 81, the receiver device may acquire the virtual home channel, which may be broadcast in the form of an aggregate metadata message. The receiver device obtains the metadata for an adjacent network or market in step 82. The mobile receiver device may then monitor the reception quality, such as counting a number of acquisition failures which occur within a period of time, to determine when a handoff to an adjacent network or transmitter should be accomplished, determination step 83. When sufficient acquisition failures are experienced to indicate that a handoff should be accomplished (i.e., determination step 83="Yes"), the mobile receiver device may access the core network of an adjacent market to obtain its full metadata set in step 84. The mobile receiver device may then use the full metadata set from the core network to prepare handoff tables and obtain other information necessary for accomplishing a handoff in step 85, and accomplish the handoff in the ordinary manner in step 86.

In summary, the various embodiments provide a method to simplify discovery and handoff for mobile TV devices that uses a virtual home channel that is not dependent on a single frequency network upper layer. This capability may be used in conjunction with a single frequency network upper layer to support areas without an upper communication layer available, or to off-load some portion of the common data bandwidth in the single frequency network. For example, the single frequency network may only carry frequency data for the multiple frequency network or only the frequency data for networks with comprehensive market metadata. The various embodiments provide for the creation of a virtual home channel by networks carrying core market metadata on all participating transmitters or networks, or a subset of the metadata that achieves coverage of the market area. The metadata may include a list of frequencies, program guide data, subscribable services, data download schedules, etc.

The metadata may be broadcast using the File Delivery over Unidirectional Transport (FLUTE) protocol or the FLUTE/ALC file transfer application for members, though not for the download itself, except in the case of the program guide. In an embodiment, the metadata may include a transmitter "color" or group identifier to facilitate handoff processes.

In an embodiment, the metadata may include a sequence number and an effective time for carrying the metadata per transmitter network. In various embodiments, metadata may be aggregated in a variety of ways, including all metadata for all networks, metadata for only adjacent networks and markets, partial metadata for other markets and networks, and partial metadata for adjacent markets and networks. This determination of adjacent markets and networks may be based upon geographic information, such as the distance and broadcast coverage area size and shape.

A central aggregation server may be provided to collect and receive metadata from all network and market participants, compile the metadata into specific aggregate metadata packages (e.g., full and partial sets of metadata depending upon the embodiment implemented in the network), and redistribute the metadata packages to the network and market participants. As mentioned above, the central aggregation server may be maintained by one or more of the participating networks, or may be maintained by a third party unrelated to the participating networks. In another embodiment, the function of aggregating metadata may be distributed among the participants, with the participating networks and markets exchanging metadata and using shared or common rules to create metadata packages (e.g., full and partial sets of metadata depending upon the embodiment implemented in the network).

In an embodiment, a limited subset of the metadata for neighboring networks or markets may be broadcast, which may include a list of frequencies which details metadata for the current market, selective common metadata from adjacent markets, a list of frequencies with metadata for adjacent markets, and metadata for a core transmitter in an adjacent market from which receiver devices may receive the entire metadata set.

An embodiment may provide a means to execute an implicit handoff to the same or similar content within a single market where there is a similar service metadata, and between markets where there is similar service metadata. An embodiment may provide a means to execute an explicit handoff to the same content using a unique content identifier within a common market when there is an exact match of service data and/or multiplex details, and between two markets when there is an exact match of service data and/or multiplex details.

An embodiment includes a provision for communication of physical layer configuration information, including data about the organization of significant timeslots for mobile reception. This may include providing receiver devices (e.g., by provisioning or broadcasting) with the knowledge of potential concurrent reception, or at least a partial reception of handoff candidates, thereby allowing evaluation of the suitability of handoff candidate networks by receiver devices. A further embodiment may include declaring start positions of and durations of specific multiplexes or services.

A further embodiment may include staggering start times in a cyclic fashion so as to allow concurrent reception of the same service or metadata on multiple networks. This may involve skipping multiple services in the selection of actual cyclic patterns to be used in order to reduce the probability of service overlap in the temporal domain, particularly among networks with overlapping broadcast coverage areas. A further embodiment may include identification of market membership.

A further embodiment may include provisioning for the communication of physical layer parameters used by transmitters to encode broadcast waveforms in the virtual home channel metadata. Such physical layer parameters may be communicated for adjacent transmitters, providing such information inter-network and intra-network. In an embodiment, the receiving device can use the physical layer parameters specified in the virtual home channel metadata to determine the suitability of adjacent networks for desired content.

Figure 9:
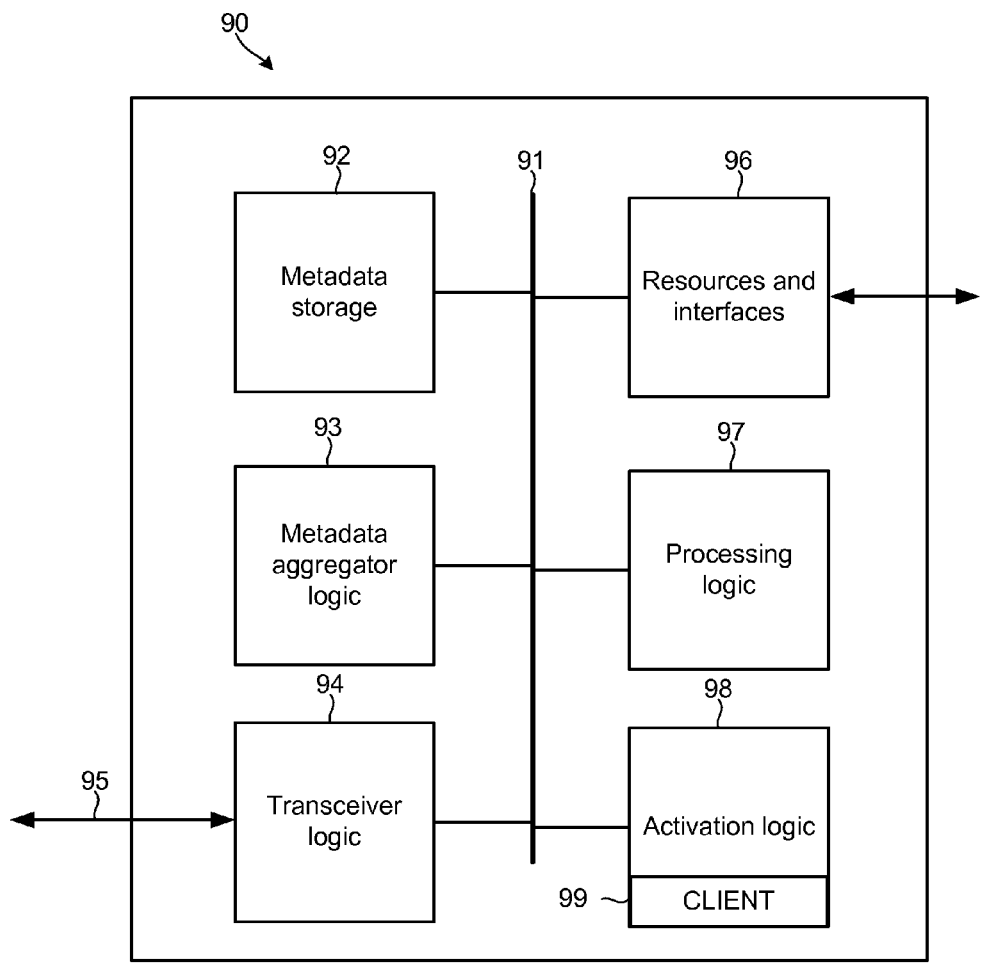
FIG. 9 is a logic block diagram of an aggregator server according to an embodiment.

FIG. 9 illustrates one implementation of an aggregator server 90 suitable for use in various implementations of the content delivery system. For example, the server 90 can be used as the metadata aggregating computer in an aggregation center 200, or as a processor for generating metadata according to shared rules at individual transmitters, according to the various embodiments. The server 90 may comprise a processing logic 97, resources and interfaces 96, and transceiver logic 94, all coupled to an internal data bus 91. The server 90 may also comprise activation logic 98, a metadata storage 92, and metadata aggregator logic 93, which are also coupled to the data bus 91.

According to various implementations, the processing logic 97 may comprise a CPU, processor, gate array, hardware logic, memory elements, virtual machine, software, and/or any combination of hardware and software. Thus, the processing logic 97 can comprise logic to execute processor-executable instructions and control one or more other functional elements of the server 90 via the internal data bus 91.

The resources and interfaces 96 may comprise hardware and/or software elements that allow the server 90 to communicate with internal and external systems. For example, the internal systems may include mass storage systems, memory, a display driver, a modem, or other internal device resources. The external systems may include user interface devices, printers, disk drives, or other local devices or systems.

The transceiver logic 94 may comprise hardware, software, and/or other logic that can operate to allow the server 90 to transmit and receive data and/or other information with remote devices or systems using a communication channel 95. For example, in various implementations, the communication channel 95 may comprise any suitable type of communication link to allow the server 90 to communicate with a data network and/or the Internet.

The activation logic 98 may comprise a CPU, processor, gate array, hardware logic, memory elements, virtual machine, software, and/or any combination of hardware, software, data, and/or other resources. The activation logic 98 may operate to activate internal and/or external processors or devices to allow the server 90 and/or to select and receive metadata from other networks and markets. In various implementations, the activation logic 98 can transmit a client program 99 to the server and/or devices during the activation process. The client program 98 can execute on the server 90 to receive metadata from other networks and markets. Thus, the activation logic 98 can operate to authenticate other servers providing metadata, and download received metadata for storage in the metadata storage 92.

The metadata storage 92 may comprise data storage in memory suitable for use in generating aggregate metadata packages in any suitable format. For example, the metadata storage 92 may be stored in a local memory of the server 90, and comprise metadata received from other networks and markets, geographic and coverage area information received from or stored in advance regarding other networks and markets, aggregation rules, and/or any other types of relevant information.

The metadata aggregator logic 93 may comprise computer hardware and/or software that operate to generate aggregated metadata packages for transmission to participating networks and markets via the transceiver logic 94. The metadata aggregator logic 93 may use the data from participating networks and markets accessed from the metadata storage 92 in combination with aggregation rules to generate aggregated metadata packages suitable for transmission to particular networks and markets as described in the various embodiments.

In various implementations, the generation and delivery of aggregate metadata messages may be accomplished in automatic processing according to program instructions stored on a non-transitory computer-readable storage medium, which when executed by a processor, for example, the processing logic 97 and/or the metadata aggregator logic 93, can provide the functions of the server 90 described herein. For example, the program instructions may be loaded into the server 90 from non-transitory computer-readable storage media, such as a floppy disk, CDROM, memory card, FLASH memory device, RAM, ROM, or any other type of memory device or computer-readable media that can interface with the server 90 through the resources 96. In various implementations, the instructions can be downloaded into the server 90 from an external non-transitory storage device or network resource that interfaces to the server 90 through the transceiver logic 95.

Figure 10:
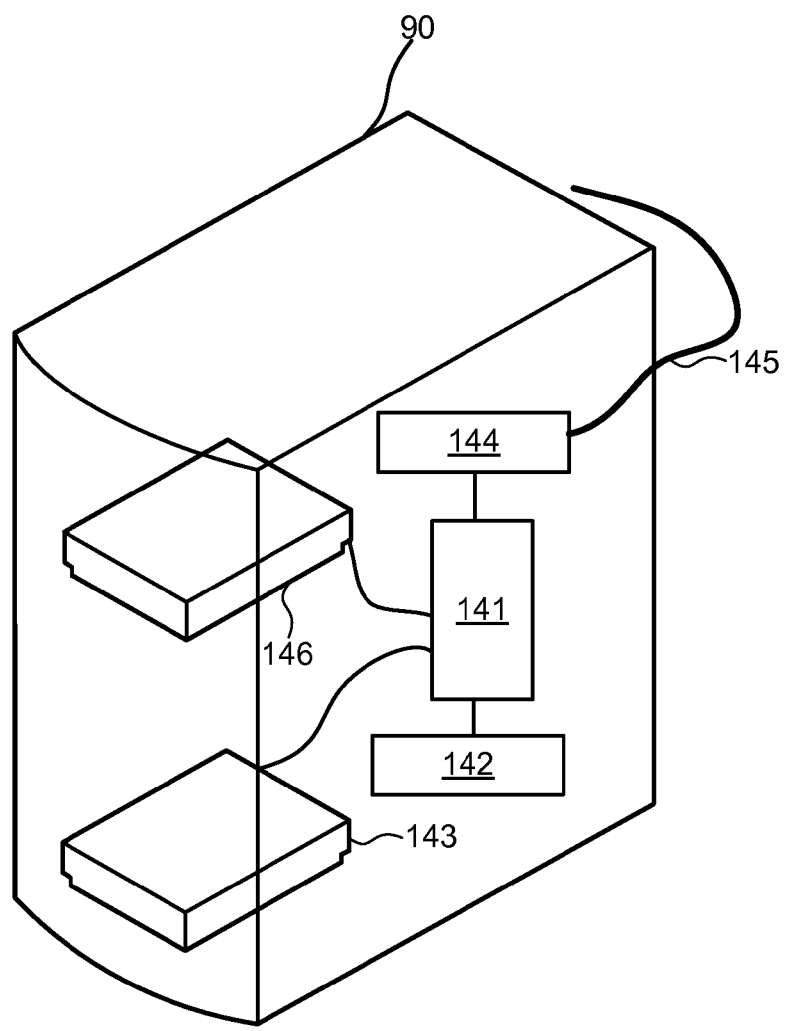
FIG. 10 is a component block diagram of a server device suitable for use in an embodiment.

The aggregator server 90 may be implemented with any of a variety of general purpose computers or remote server devices, such as the server 90 illustrated in FIG. 10. Such a server 90 typically includes a processor 141 coupled to volatile memory 142 and a large capacity nonvolatile memory, such as a disk drive 143. The server 90 may also include a floppy disc drive and/or a compact disc (CD) drive 146 coupled to the processor 141. The server 90 may also include network access ports 144 coupled to the processor 141 for communicating with a network 145, such as the Internet.

Figure 11:
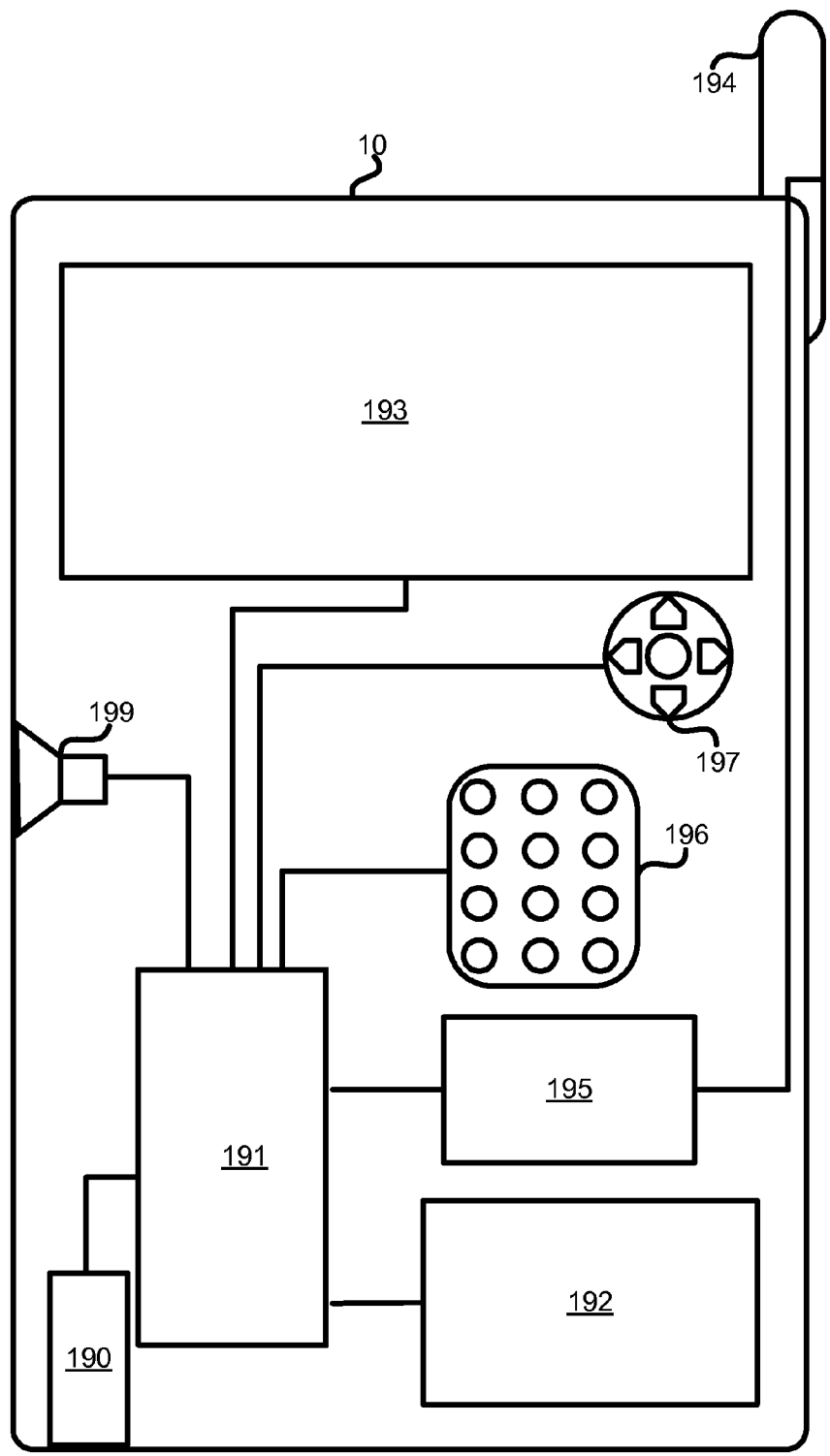
FIG. 11 is a component block diagram of a mobile device suitable for use in an embodiment.

Typical mobile devices 10 suitable for use with the various embodiments will have in common the components illustrated in FIG. 11. For example, an exemplary mobile device 10 may include a processor 191 coupled to internal memory 192, a display 193, and to a speaker 199. Additionally, the mobile device 10 may have an antenna 194 for sending and receiving electromagnetic radiation that is connected to a wireless data link and/or cellular telephone transceiver 195 coupled to the processor 191. In some implementations, the transceiver 195 and portions of the processor 191 and memory 192 used for cellular telephone communications are collectively referred to as the air interface since it provides a data interface via a wireless data link. Mobile devices typically also include a key pad 196 or miniature keyboard and menu selection buttons or rocker switches 197 for receiving user inputs.

The processors 191, 141 may be any programmable microprocessor, microcomputer or multiple processor chip or chips that can be configured by software instructions (applications) to perform a variety of functions, including the functions of the various embodiments described herein. In some mobile devices, multiple processors 191, 141 may be provided, such as one processor dedicated to wireless communication functions and one processor dedicated to running other applications. Typically, software applications may be stored in the internal memory 192, 142 before they are accessed and loaded into the processor 191, 141. In some mobile devices and servers, the processor 191, 141 may include internal memory sufficient to store the application software instructions. The mobile device 10 may also include a separate memory chip 190 such as smart card for storing information related to credits, token and coupons such as in an electronic purse according to the various embodiments. In some mobile devices, the secure memory may be in a separate memory chip coupled to the processor 191. In many mobile devices 10 and servers 90, the internal memory 192, 142 may be a volatile or nonvolatile memory, such as flash memory, or a mixture of both. For the purposes of this description, a general reference to memory refers to all memory accessible by the processor 191, 142, including internal memory 192, 142, a memory chip 190, removable memory plugged into the mobile device or server, and memory within the processor 191, 142 itself.

The various embodiments may also be applied to provide the neighbor list information and the physical layer metadata for use at power up or in the case of loss of signal which will enable faster availability and reacquisition of services. In other words, the broadcast of frequency maps or lists for multiple networks and markets, physical layer metadata for multiple networks and markets, neighbor lists, and other metadata via the embodiments may also be used to enable faster power up acquisition, and faster recovery from loss of signal conditions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more computer-executable or processor-executable instructions or code on a non-transitory computer-readable or processor-readable storage medium. The steps of a method or algorithm disclosed herein may be embodied in a processor-executable software module executed which may reside on a non-transitory computer-readable storage medium. Non-transitory computer-readable and processor-readable storage media include any form of computer storage media. A non-transitory storage media may be any available media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable and processor-readable storage media. Additionally, the operations of a method or algorithm may reside as one or any combination or set of codes and/or instructions on a -transitory computer-readable and processor-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method for communicating broadcast metadata for a plurality of multi-frequency broadcast networks, comprising:
   receiving metadata for each of the plurality of multi-frequency broadcast networks, wherein each of the plurality of multi-frequency broadcast networks broadcasts a virtual home channel;
   generating a metadata package for a particular one of the plurality of multi-frequency broadcast networks, wherein the metadata package comprises at least a portion of metadata received from at least one other of the plurality of multi-frequency broadcast networks; and
   providing the generated metadata package to the particular one of the plurality of multi-frequency broadcast networks for broadcast over the virtual home channel,
   wherein broadcast of the metadata package facilitates handoff of a receiver device in a coverage area of the particular one of the plurality of multi-frequency broadcast networks to the at least one other of the plurality of multi-frequency broadcast networks by tuning to the virtual home channel, and wherein the metadata package provides physical layer parameters configured to enable the receiver device to switch a content or program source.

2. The method of claim 1, wherein the particular one of the plurality of multi-frequency broadcast networks is a local one of the plurality of multi-frequency broadcast networks within a market of a geographic area and carries local content.

3. The method of claim 1, wherein the generated metadata package is broadcast using a File Delivery over Unidirectional Transport (FLUTE) protocol.

4. The method of claim 1, wherein the virtual home channel is broadcast by more than one of the plurality of multi-frequency broadcast networks according to a staggered cyclic pattern configured to reduce temporal domain service overlap.

5. The method of claim 1, wherein broadcasts on the virtual home channel are synchronized in time among the plurality of multi-frequency broadcast networks such that the generated metadata package can be used by the receiver device to evaluate potential reception as supported in the physical layer parameters.

6. The method of claim 5, wherein the synchronized broadcasts are staggered such that the receiver device may evaluate a same service from multiple different ones of the plurality of multi-frequency broadcast networks.

7. The method of claim 6, wherein the synchronized broadcasts are staggered in terms of four phases in time.

8. The method of claim 1, further comprising:
   broadcasting content among the plurality of multi-frequency broadcast networks, wherein the broadcasting of content is staggered among adjacent ones of the plurality of multi-frequency broadcast networks to reduce temporal domain service overlap,
   wherein the generated metadata package provides information about the broadcasting of content being staggered to enable the receiver device to receive the broadcasting of content.

9. The method of claim 1, wherein the broadcast of the metadata package by the particular one of the plurality of multi-frequency broadcast networks is configured to enable the receiver device to achieve faster power up acquisition, and faster recovery from loss of signal conditions.

10. The method of claim 1, wherein receiving metadata for each of the plurality of multi-frequency broadcast networks comprises receiving the metadata from each of the plurality of multi-frequency broadcast networks in a central metadata aggregation server, the method further comprising:
   determining portions of the metadata received from the plurality of multi-frequency broadcast networks that should be broadcast by the particular one of the plurality of multi-frequency broadcast networks.

11. The method of claim 10, wherein the central metadata aggregation server is maintained by one or more of the plurality of multi-frequency broadcast networks.

12. The method of claim 10, wherein the central metadata aggregation server is maintained by a third party not associated with any of the plurality of multi-frequency broadcast networks.

13. The method of claim 10, wherein the determined portions of metadata received from the plurality of multi-frequency broadcast networks that should be broadcast by the particular one of the plurality of multi-frequency broadcast networks comprises substantially all of the received metadata.

14. The method of claim 10, wherein the determined portions of metadata received from the plurality of multi-frequency broadcast networks that should be broadcast by the particular one of the plurality of multi-frequency broadcast networks comprises a subset of the received metadata.

15. The method of claim 10, wherein the determined portions of metadata received from the plurality of multi-frequency broadcast networks that should be broadcast by the particular one of the plurality of multi-frequency broadcast networks comprises metadata for a particular network within a market which broadcasts at least a portion of all metadata for all networks within the market.

16. The method of claim 10, wherein determining portions of the metadata received from the plurality of multi-frequency broadcast networks that should be broadcast by one or more of the plurality of multi-frequency broadcast networks comprises determining portions of the received metadata that should be broadcast based upon reception areas within one or more of the plurality of multi-frequency broadcast networks.

17. The method of claim 10, wherein the determined portions of metadata received from the plurality of multi-frequency broadcast networks that should be broadcast by the particular one of the plurality of multi-frequency broadcast networks comprises substantially all of the metadata received from ones of the plurality of multi-frequency broadcast networks with broadcast coverage areas located adjacent to a coverage area of the particular one the plurality of multi-frequency broadcast networks.

18. The method of claim 10, wherein determining portions of the metadata received from the plurality of multi-frequency broadcast networks that should be broadcast by the particular one of the plurality of multi-frequency broadcast networks comprises:
selecting for broadcast metadata received from ones of the plurality of multi-frequency broadcast networks with broadcast coverage areas located adjacent to a coverage area of the particular one of the plurality of multi-frequency broadcast networks.

19. The method of claim 18, wherein ones of the plurality of multi-frequency broadcast networks with broadcast coverage areas located adjacent to the coverage area of the particular one of the plurality of multi-frequency broadcast networks are identified based upon distances between the particular one of the plurality of multi-frequency broadcast networks and others of the plurality of multi-frequency broadcast networks.

20. The method of claim 19, wherein ones of the plurality of multi-frequency broadcast networks with broadcast coverage areas located adjacent to the coverage area of the particular one the plurality of multi-frequency broadcast networks is further determined based upon a shape of broadcast coverage areas of the plurality of multi-frequency broadcast networks.

21. The method of claim 10, wherein the determined portions of the metadata received from the plurality of multi-frequency broadcast networks that should be broadcast by the particular one of the plurality of multi-frequency broadcast networks is selected from the group consisting of a list of network frequencies, select ones of the physical layer parameters used by the transmitters to encode broadcast waveforms, program guide data, subscribable services, data download schedules, a transmitter color or group identifier, and a metadata sequence number.

22. The method of claim 1, wherein generating a metadata package for the particular one of the plurality of multi-frequency broadcast networks comprises generating a plurality of metadata packages for at least a subset of the plurality of multi-frequency broadcast networks.

23. The method of claim 22, wherein one or more of the plurality of metadata packages includes a subset of the metadata received from the plurality of multi-frequency broadcast networks.

24. The method of claim 1, further comprising:
generating a respective metadata package for each of the plurality of multi-frequency broadcast networks; and
transmitting the generated respective metadata packages to each of the plurality of multi-frequency broadcast networks for broadcast.

25. The method of claim 24, wherein generating a respective metadata package for each of the plurality of multi-frequency broadcast networks comprises generating metadata packages including N subsets of metadata.

26. The method of claim 1, wherein receiving metadata for each of the plurality of multi-frequency broadcast networks comprises receiving the metadata from each of the plurality of multi-frequency broadcast networks in a local one of the plurality of multi-frequency broadcast networks, the method further comprising:
applying a set of rules to the metadata received from the plurality of multi-frequency broadcast networks to determine the portions of the metadata received from the plurality of multi-frequency broadcast networks that should be broadcast by the local one of the plurality of multi-frequency broadcast networks.

27. The method of claim 26, wherein receiving the metadata for each of the plurality of multi-frequency broadcast networks in the local one of the plurality of multi-frequency broadcast networks comprises one of receiving the metadata from a data network and receiving the metadata from broadcast transmissions of one or more of the plurality of multi-frequency broadcast networks.

28. A computer coupled to a multi-frequency broadcast network and configured with computer-executable software instructions to perform operations comprising:
receiving metadata for each of a plurality of multi-frequency broadcast networks, wherein each of the plurality of multi-frequency broadcast networks broadcasts a virtual home channel;
generating a metadata package for a particular one of the plurality of multi-frequency broadcast networks, wherein the metadata package comprises at least a portion of metadata received from at least one other of the plurality of multi-frequency broadcast networks; and
providing the generated metadata package to the particular one of the plurality of multi-frequency broadcast networks for broadcast over the virtual home channel,
wherein broadcast of the metadata package facilitates handoff of a receiver device in a coverage area of the particular one of the plurality of multi-frequency broadcast networks to the at least one other of the plurality of multi-frequency broadcast networks by tuning to the virtual home channel, and wherein the metadata package provides physical layer parameters configured to enable the receiver device to switch a content or program source.

29. The computer of claim 28, wherein the multi-frequency broadcast network is within a market of a geographic area and broadcasts local content.

30. The computer of claim 28, wherein the computer is configured with computer-executable software instructions such that the generated metadata package is broadcast using a File Delivery over Unidirectional Transport (FLUTE) protocol.

31. The computer of claim 28, wherein the computer is configured with computer-executable software instructions such that the virtual home channel is broadcast at times according to a staggered cyclic pattern configured to reduce temporal domain service overlap of metadata broadcasts by the plurality of multi-frequency broadcast networks.

32. The computer of claim 28, wherein the computer is configured with computer-executable software instructions such that broadcasts on the virtual home channel are synchronized in time with metadata broadcasts of other ones of the plurality of multi-frequency broadcast networks in a manner that enables the receiver device to use the metadata package to evaluate potential reception as supported in the physical layer parameters.

33. The computer of claim 32, wherein the computer is further configured with computer-executable software instructions such that the synchronized broadcasts are staggered in a manner that enables the receiver device to evaluate a same service from multiple different ones of the plurality of multi-frequency broadcast networks.

34. The computer of claim 33, wherein the computer is configured with computer-executable software instructions such that the synchronized broadcasts are staggered in terms of four phases in time.

35. The computer of claim 28, wherein the computer is configured with computer-executable software instructions such that:
broadcasting content among the plurality of multi-frequency broadcast networks includes first broadcasts of content by the multi-frequency broadcast network is staggered in time with respect to second broadcasts of content by adjacent ones of the plurality of multi-frequency broadcast networks to reduce temporal domain service overlap,
wherein the generated metadata package provides information about the broadcasting content being staggered to enable the receiver device to receive the broadcasting content.

36. The computer of claim 28, wherein the computer is configured with computer-executable software instructions such that the broadcast of the metadata package by the particular one of the plurality of multi-frequency broadcast networks enables the receiver device to achieve faster power up acquisition and faster recovery from loss of signal conditions.

37. The computer of claim 28, wherein:
the computer is configured with computer-executable software instructions such that receiving metadata for each of the plurality of multi-frequency broadcast networks comprises receiving the metadata from each of the plurality of multi-frequency broadcast networks in the computer which is configured to function as a central metadata aggregation server; and
the computer is configured with computer-executable software instructions to perform operations further comprising determining portions of the metadata received from the plurality of multi-frequency broadcast networks that should be broadcast by the particular one of the plurality of multi-frequency broadcast networks.

38. The computer of claim 37, wherein the computer is maintained by a third party not associated with any of the plurality of multi-frequency broadcast networks.

39. The computer of claim 37, wherein the computer is configured with computer-executable software instructions such that the determined portions of metadata received from the plurality of multi-frequency broadcast networks that should be broadcast by the particular one of the plurality of multi-frequency broadcast networks comprises substantially all of the received metadata.

40. The computer of claim 37, wherein the computer is configured with computer-executable software instructions such that the determined portions of metadata received from the plurality of multi-frequency broadcast networks that should be broadcast by the particular one of the plurality of multi-frequency broadcast networks comprises a subset of the received metadata.

41. The computer of claim 37, wherein the computer is configured with computer-executable software instructions such that the determined portions of metadata received from the plurality of multi-frequency broadcast networks that should be broadcast by the particular one of the plurality of multi-frequency broadcast networks comprises metadata for a particular network within a market which broadcasts at least a portion of all metadata for all networks within the market.

42. The computer of claim 37, wherein the computer is configured with computer-executable software instructions such that determining portions of the metadata received from the plurality of multi-frequency broadcast networks that should be broadcast by the particular one of the plurality of multi-frequency broadcast networks comprises determining portions of the received metadata that should be broadcast based upon reception areas within one or more of the plurality of multi-frequency broadcast networks.

43. The computer of claim 37, wherein the computer is configured with computer-executable software instructions such that the determined portions of metadata received from the plurality of multi-frequency broadcast networks that should be broadcast by the particular one of the plurality of multi-frequency broadcast networks comprises substantially all of the metadata received from ones of the plurality of multi-frequency broadcast networks with broadcast coverage areas located adjacent to a coverage area of the particular one of the plurality of multi-frequency broadcast networks coupled to the computer.

44. The computer of claim 37, wherein the computer is configured with computer-executable software instructions such that determining portions of the metadata received from the plurality of multi-frequency broadcast networks that should be broadcast by the particular one of the plurality of multi-frequency broadcast networks comprises
determining the portions of the metadata received from ones of the plurality of multi-frequency broadcast networks with broadcast coverage areas located adjacent to a coverage area of the particular one of the plurality of multi-frequency broadcast networks coupled to the computer.

45. The computer of claim 44, wherein the computer is configured with computer-executable software instructions such that the plurality of multi-frequency broadcast networks with broadcast coverage areas located adjacent to the coverage area of the particular one of the multi-frequency broadcast networks coupled to the computer are identified based upon distances between the particular one of the multi-frequency broadcast network and others of the plurality of multi-frequency broadcast networks.

46. The computer of claim 45, wherein the computer is configured with computer-executable software instructions such that the plurality of multi-frequency broadcast networks with broadcast coverage areas located adjacent to the coverage area of the particular one of the multi-frequency broadcast networks coupled to the computer are further identified based upon a shape of broadcast coverage areas of the plurality of multi-frequency broadcast networks.

47. The computer of claim 37, wherein the computer is configured with computer-executable software instructions such that the determined portions of the metadata received from the plurality of multi-frequency broadcast networks that should be broadcast is selected from the group consisting of a list of network frequencies, select ones of the physical layer parameters used by the transmitters to encode broadcast waveforms, program guide data, subscribable services, data download schedules, a transmitter color or group identifier, and a metadata sequence number.

48. The computer of claim 28, wherein the computer is configured with computer-executable software instructions such that generating a metadata package for the particular one of the plurality of multi-frequency broadcast networks comprises generating a plurality of metadata packages for at least a subset of the plurality of multi-frequency broadcast networks.

49. The computer of claim 48, wherein the computer is configured with computer-executable software instructions such that one or more of the plurality of metadata packages includes a subset of the metadata received from the plurality of multi-frequency broadcast networks.

50. The computer of claim 28, wherein the computer is configured with computer-executable software instructions to perform operations further comprising generating a respective metadata package for each of the plurality of multi-frequency broadcast networks; and
transmitting the generated respective metadata packages to each of the plurality of multi-frequency broadcast networks for broadcast.

51. The computer of claim 50, wherein the computer is configured with computer-executable software instructions such that generating a respective metadata package for each of the plurality of multi-frequency broadcast networks comprises generating metadata packages including N subsets of metadata.

52. The computer of claim 28, wherein the computer is configured with computer-executable software instructions to perform operations further comprising applying a set of rules to the metadata received from the plurality of multi-frequency broadcast networks to determine the portions of the metadata received from the plurality of multi-frequency broadcast networks that should be broadcast by the multi-frequency broadcast network coupled to the computer.

53. The computer of claim 52, wherein the computer is configured with computer-executable software instructions such that receiving the metadata for each of the plurality of multi-frequency broadcast networks comprises one of receiving the metadata from a data network and receiving the metadata from broadcast transmissions of one or more of the plurality of multi-frequency broadcast networks.

54. A computer coupled to a multi-frequency broadcast network, comprising:
means for receiving metadata for each of the plurality of multi-frequency broadcast networks, wherein each of the plurality of multi-frequency broadcast networks broadcasts a virtual home channel;
means for generating a metadata package for a particular one of the plurality of multi-frequency broadcast networks, wherein the metadata package comprises at least a portion of metadata received from at least one other of the plurality of multi-frequency broadcast networks; and
means for providing the generated metadata package to the particular one of the plurality of multi-frequency broadcast networks for broadcast over the virtual home channel,
wherein broadcast of the metadata package facilitates handoff of a receiver device in a coverage area of the particular one of the plurality of multi-frequency broadcast networks to the at least one other of the plurality of multi-frequency broadcast networks by tuning to the virtual home channel, and wherein the metadata package provides physical layer parameters configured to enable the receiver device to switch a content or program source.

55. The computer of claim 54, wherein the multi-frequency broadcast network is within a market of a geographic area and broadcasts local content.

56. The computer of claim 54, wherein the means for broadcasting metadata comprises means for broadcasting the generated metadata package using a File Delivery over Unidirectional Transport (FLUTE) protocol.

57. The computer of claim 54, further comprising means for broadcasting the generated metadata package at times according to a staggered cyclic pattern configured to reduce temporal domain service overlap of metadata broadcasts by the plurality of multi-frequency broadcast networks.

58. The computer of claim 54, wherein broadcasts on the virtual home channel are synchronized in time with metadata broadcasts among the plurality of multi-frequency broadcast networks in a manner that enables the receiver device to use the generated metadata package to evaluate potential reception as supported in the physical layer parameters.

59. The computer of claim 58, wherein the synchronized broadcasts are staggered such that the receiver device may evaluate a same service from multiple different ones of the plurality of multi-frequency broadcast networks.

60. The computer of claim 59, wherein the synchronized broadcasts are staggered in terms of four phases in time.

61. The computer of claim 54, further comprising:
means for broadcasting content among the plurality of multi-frequency broadcast networks, wherein the means for broadcasting content staggers broadcasts of content by the multi-frequency broadcast network in time with respect to content broadcasts of adjacent ones of the plurality of multi-frequency broadcast networks to reduce temporal domain service overlap,
wherein the generated metadata package provides information about the broadcasting content being staggered to enable the receiver device to receive the broadcasting content.

62. The computer of claim 54, wherein the broadcast of the metadata package by the particular one of the plurality of multi-frequency broadcast networks is configured to enable the receiver device to achieve faster power up acquisition and faster recovery from loss of signal conditions.

63. The computer of claim 54, wherein:
the means for receiving metadata for each of the plurality of multi-frequency broadcast networks comprises means for receiving the metadata from each of the plurality of multi-frequency broadcast networks in a central metadata aggregation server; and
the computer further comprises means for determining portions of the metadata received from the plurality of multi-frequency broadcast networks that should be broadcast by the particular one of the plurality of multi-frequency broadcast networks.

64. The computer of claim 63, wherein the computer is maintained by a third party not associated with any of the plurality of multi-frequency broadcast networks.

65. The computer of claim 63, wherein the means for determining portions of the metadata received from the plurality of multi-frequency broadcast networks that should be broadcast by the particular one of the plurality of multi-frequency broadcast networks comprises means for broadcasting substantially all of the received metadata.

66. The computer of claim 63, wherein the means for determining portions of the metadata received from the plurality of multi-frequency broadcast networks that should be broadcast by the particular one of the plurality of multi-frequency broadcast networks comprises means for broadcasting a subset of the received metadata.

67. The computer of claim 63, wherein the means for determining portions of the metadata received from the plurality of multi-frequency broadcast networks that should be broadcast by the particular one of the plurality of multi-frequency broadcast networks comprises means for determining a first portion of received metadata to be broadcast for a particular network within a market which broadcasts at least a second portion of all metadata for all networks within the market.

68. The computer of claim 63, wherein the means for determining portions of the metadata received from the plurality of multi-frequency broadcast networks that should be broadcast by the particular one of the plurality of multi-frequency broadcast networks comprises means for determining portions of the received metadata that should be broadcast based upon reception areas within one or more of the plurality of multi-frequency broadcast networks.

69. The computer of claim 63, wherein the means for determining portions of the metadata received from the plurality of multi-frequency broadcast networks that should be broadcast by the particular one of the plurality of multi-frequency broadcast networks comprises means for broadcasting substantially all of the metadata received from ones of the plurality of multi-frequency broadcast networks with broadcast coverage areas located adjacent to a coverage area of the particular one of the multi-frequency broadcast networks coupled to the computer.

70. The computer of claim 63, wherein the means for determining portions of the metadata received from the plurality of multi-frequency broadcast networks that should be broadcast by the particular one of the plurality of multi-frequency broadcast networks comprises:
means for selecting for broadcast metadata received from ones of the plurality of multi-frequency broadcast networks with broadcast coverage areas located adjacent to a coverage area of the particular one of the plurality of multi-frequency broadcast networks coupled to the computer based upon distances between the particular one of the plurality of multi-frequency broadcast networks and others of the plurality of multi-frequency broadcast networks.

71. The computer of claim 70, wherein the means for determining portions of the metadata received from the plurality of multi-frequency broadcast networks that should be broadcast by the particular one of the plurality of multi-frequency broadcast networks further comprises:
means for selecting for broadcast metadata received from ones of the plurality of multi-frequency broadcast networks with broadcast coverage areas located adjacent to a coverage area of the particular one of the multi-frequency broadcast networks coupled to the computer based upon a shape of broadcast coverage areas of the plurality of multi-frequency broadcast networks.

72. The computer of claim 63, wherein the means for determining portions of the metadata received from the plurality of multi-frequency broadcast networks that should be broadcast comprises means for selecting metadata selected from the group consisting of a list of network frequencies, select ones of the physical layer parameters used by the transmitters to encode broadcast waveforms, program guide data, subscribable services, data download schedules, a transmitter color or group identifier, and a metadata sequence number.

73. The computer of claim 54, wherein the means for generating a metadata package for the particular one of the plurality of multi-frequency broadcast networks comprises means for generating a plurality of metadata packages for at least a subset of the plurality of multi-frequency broadcast networks.

74. The computer of claim 73, wherein the means for generating the plurality of metadata packages for at least the subset of the plurality of multi-frequency broadcast networks comprises means for generating the plurality of metadata packages for at least the subset of the plurality of multi-frequency broadcast networks so that one or more of the plurality of metadata packages includes a subset of the metadata received from the plurality of multi-frequency broadcast networks.

75. The computer of claim 54, further comprising:
means for generating a respective metadata package for each of the plurality of multi-frequency broadcast networks; and
means for transmitting the generated respective metadata packages to each of the plurality of multi-frequency broadcast networks for broadcast.

76. The computer of claim 75, wherein the means for transmitting the generated respective metadata packages to each of the plurality of multi-frequency broadcast networks for broadcast comprises means for generating a respective metadata package for each of the plurality of multi-frequency broadcast networks comprises generating metadata packages including N subsets of metadata.

77. The computer of claim 54, further comprising means for applying a set of rules to the metadata received from the plurality of multi-frequency broadcast networks to determine the portions of the metadata received from the plurality of multi-frequency broadcast networks that should be broadcast by the particular one of the plurality of multi-frequency broadcast networks coupled to the computer.

78. The computer of claim 77, wherein the means for receiving the metadata for each of the plurality of multi-frequency broadcast networks comprises one of means for receiving the metadata from a data network and means for receiving the metadata from broadcast transmissions of one or more of the plurality of multi-frequency broadcast networks.

79. A non-transitory computer-readable storage medium having stored thereon computer-executable software instructions configured to cause a computer coupled to a multi-frequency broadcast network to perform operations comprising:
receiving metadata for each of the plurality of multi-frequency broadcast networks, wherein each of the plurality of multi-frequency broadcast networks broadcasts a virtual home channel;
generating a metadata package for a particular one of the plurality of multi-frequency broadcast networks, wherein the metadata package comprises at least a portion of metadata received from at least one other of the plurality of multi-frequency broadcast networks; and providing the generated metadata package to the particular one of the plurality of multi-frequency broadcast networks for broadcast over the virtual home channel, wherein broadcast of the metadata package facilitates handoff of a receiver device in a coverage area of the particular one of the plurality of multi-frequency broadcast networks to the at least one other of the plurality of multi-frequency broadcast networks by tuning to the virtual home channel, and wherein the metadata package provides physical layer parameters configured to enable the receiver device to switch a content or program source.

80. The non-transitory computer-readable storage medium of claim 79, wherein the multi-frequency broadcast network is within a market of a geographic area and broadcasts local content.

81. The non-transitory computer-readable storage medium of claim 79, wherein the stored computer-executable software instructions are configured to cause a computer to perform operations such that the generated metadata package is broadcast using a File Delivery over Unidirectional Transport (FLUTE) protocol.

82. The non-transitory computer-readable storage medium of claim 79, wherein the stored computer-executable software instructions are configured to cause a computer to perform operations such that the virtual home channel is broadcast at times according to a staggered cyclic pattern configured to reduce temporal domain service overlap of metadata broadcasts by the plurality of multi-frequency broadcast networks.

83. The non-transitory computer-readable storage medium of claim 79, wherein the stored computer-executable software instructions are configured to cause a computer to perform operations such that broadcasts on the virtual home channel are synchronized in time with metadata broadcasts of other ones of the plurality of multi-frequency broadcast networks in a manner that enables the receiver device to use the generated metadata package to evaluate potential reception as supported in the physical layer parameters.

84. The non-transitory computer-readable storage medium of claim 83, wherein the computer is further configured with computer-executable software instructions such that the synchronized broadcasts are staggered in a manner that enables the receiver device to evaluate a same service from multiple different ones of the plurality of multi-frequency broadcast networks.

85. The non-transitory computer-readable storage medium of claim 84, wherein the stored computer-executable software instructions are configured to cause a computer to perform operations such that the synchronized broadcasts are staggered in terms of four phases in time.

86. The non-transitory computer-readable storage medium of claim 79, wherein the stored computer-executable software instructions are configured to cause a computer to perform operations further comprising:

broadcasting content among the plurality of multi-frequency broadcast networks, wherein first broadcasts of content by the multi-frequency broadcast network are staggered in time with respect to second broadcasts of content by adjacent ones of the plurality of multi-frequency broadcast networks to reduce temporal domain service overlap, wherein the generated metadata package provides information about the broadcasting content being staggered to enable the receiver device to receive the broadcasting content.

87. The non-transitory computer-readable storage medium of claim 79, wherein the stored computer-executable software instructions are configured to cause a computer to perform operations such that the broadcast of the metadata package by the particular one of the plurality of multi-frequency broadcast networks enables the receiver device to achieve faster power up acquisition and faster recovery from loss of signal conditions.

88. The non-transitory computer-readable storage medium of claim 79, wherein:

the stored computer-executable software instructions are configured to cause a computer to perform operations such that receiving metadata for each of the plurality of multi-frequency broadcast networks comprises receiving the metadata from each of the plurality of multi-frequency broadcast networks in a central metadata aggregation server; and the stored computer-executable software instructions are configured to cause a computer to perform operations further comprising determining portions of the metadata received from the plurality of multi-frequency broadcast networks that should be broadcast by the particular one of the plurality of multi-frequency broadcast networks.

89. The non-transitory computer-readable storage medium of claim 88, wherein the central metadata aggregation server is maintained by a third party not associated with any of the plurality of multi-frequency broadcast networks.

90. The non-transitory computer-readable storage medium of claim 88, wherein the stored computer-executable software instructions are configured to cause a computer to perform operations such that the determined portions of metadata received from the plurality of multi-frequency broadcast networks that should be broadcast by the particular one of the plurality of multi-frequency broadcast networks comprises substantially all of the received metadata.

91. The non-transitory computer-readable storage medium of claim 88, wherein the stored computer-executable software instructions are configured to cause a computer to perform operations such that the determined portions of metadata received from the plurality of multi-frequency broadcast networks that should be broadcast by the particular one of the plurality of multi-frequency broadcast networks comprises a subset of the received metadata.

92. The non-transitory computer-readable storage medium of claim 88, wherein the stored computer-executable software instructions are configured to cause a computer to perform operations such that the determined portions of metadata received from the plurality of multi-frequency broadcast networks that should be broadcast by the particular one of the plurality of multi-frequency broadcast networks comprises metadata for a particular network within a market which broadcasts at least a portion of all metadata for all networks within the market.

93. The non-transitory computer-readable storage medium of claim 88, wherein the stored computer-executable software instructions are configured to cause a computer to perform operations such that determining portions of the metadata received from the plurality of multi-frequency broadcast networks that should be broadcast by the particular one of the plurality of multi-frequency broadcast networks comprises determining portions of the received metadata that should be broadcast based upon reception areas within one or more of the plurality of broadcast networks.

94. The non-transitory computer-readable storage medium of claim 88, wherein the stored computer-executable software instructions are configured to cause a computer to perform operations such that the determined portion of received metadata to be broadcast comprises substantially all of the metadata received from ones of the plurality of multi-frequency broadcast networks with broadcast coverage areas located adjacent to a coverage area of the particular one of the plurality of multi-frequency broadcast networks coupled to the computer.

95. The non-transitory computer-readable storage medium of claim 88, wherein the stored computer-executable software instructions are configured to cause a computer to perform operations such that determining portions of the metadata received from the plurality of multi-frequency broadcast networks that should be broadcast by the particular one of the plurality of multi-frequency broadcast networks comprises:
  identifying the multi-frequency broadcast networks with broadcast coverage areas located adjacent to a coverage area of the particular one of the multi-frequency broadcast networks based upon distances between the particular one of the plurality of multi-frequency broadcast networks and others of the plurality of multi-frequency broadcast networks.

96. The non-transitory computer-readable storage medium of claim 95, wherein the stored computer-executable software instructions are configured to cause a computer to perform operations such that the multi-frequency broadcast networks with broadcast coverage areas located adjacent to the coverage area of the particular one of the plurality of multi-frequency broadcast networks are further identified based upon a shape of broadcast coverage areas of the plurality of multi-frequency broadcast networks.

97. The non-transitory computer-readable storage medium of claim 88, wherein the stored computer-executable software instructions are configured to cause a computer to perform operations such that the determined portions of the metadata received from the plurality of multi-frequency broadcast networks that should be broadcast by the particular one of the plurality of multi-frequency broadcast networks is selected from the group consisting of a list of network frequencies, select ones of the physical layer parameters used by the transmitters to encode broadcast waveforms, program guide data, subscribable services, data download schedules, a transmitter color or group identifier, and a metadata sequence number.

98. The non-transitory computer-readable storage medium of claim 79, wherein the stored computer-executable software instructions are configured to cause a computer to perform operations such that generating a metadata package for the particular one of the plurality of multi-frequency broadcast networks comprises generating a plurality of metadata packages for at least a subset of the plurality of multi-frequency broadcast networks.

99. The non-transitory computer-readable storage medium of claim 98, wherein the stored computer-executable software instructions are configured to cause a computer to perform operations such that one or more of the plurality of generated metadata packages includes the subset of the metadata received from the plurality of multi-frequency broadcast networks.

100. The non-transitory computer-readable storage medium of claim 79, wherein the stored computer-executable software instructions are configured to cause a computer to perform operations further comprising:
  generating a respective metadata package for each of the plurality of multi-frequency broadcast networks; and
  transmitting the generated metadata package to the one or more of the plurality of multi-frequency broadcast networks for broadcast comprises transmitting the generated respective metadata packages to each of the plurality of multi-frequency broadcast networks for broadcast.

101. The non-transitory computer-readable storage medium of claim 100, wherein the stored computer-executable software instructions are configured to cause a computer to perform operations such that generating a respective metadata package for each of the plurality of multi-frequency broadcast networks comprises generating metadata packages including N subsets of metadata.

102. The non-transitory computer-readable storage medium of claim 79, wherein the stored computer-executable software instructions are configured to cause a computer to perform operations further comprising applying a set of rules to the metadata received from the plurality of multi-frequency broadcast networks to determine the portions of the metadata that should be broadcast by the particular one of the multi-frequency broadcast networks coupled to the computer.

103. The non-transitory computer-readable storage medium of claim 102, wherein the stored computer-executable software instructions are configured to cause a computer to perform operations such that receiving the metadata for each of the plurality of multi-frequency broadcast networks comprises one of receiving the metadata from a data network and receiving the metadata from broadcast transmissions of one or more of the plurality of multi-frequency broadcast networks.

104. The computer of claim 37, wherein the computer is maintained by one or more of the plurality of multi-frequency broadcast networks.

105. The computer of claim 63, wherein the computer is maintained by one or more of the plurality of multi-frequency broadcast networks.

106. The non-transitory computer-readable storage medium of claim 88, wherein the computer is maintained by one or more of the plurality of multi-frequency broadcast networks.

* * * * *